US012277879B2

(12) United States Patent
Pan et al.

(10) Patent No.: US 12,277,879 B2
(45) Date of Patent: Apr. 15, 2025

(54) DISPLAY DATA PROCESSING METHOD AND DEVICE, AS WELL AS DISPLAY DEVICE

(71) Applicants: Chongqing BOE Optoelectronics Technology Co., Ltd., Chongqing (CN); BOE TECHNOLOGY GROUP CO., LTD., Beijing (CN)

(72) Inventors: Hongxin Pan, Beijing (CN); Wentao Zhu, Beijing (CN); Zhiheng Zhou, Beijing (CN); Jingchao Yuan, Beijing (CN); Jingpeng Zhao, Beijing (CN); Xin Duan, Beijing (CN)

(73) Assignees: Chongqing BOE Optoelectronics Technology Co., Ltd., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/253,457

(22) PCT Filed: Apr. 29, 2022

(86) PCT No.: PCT/CN2022/090478

§ 371 (c)(1), (2) Date: May 18, 2023

(87) PCT Pub. No.: WO2023/206428

PCT Pub. Date: Nov. 2, 2023

(65) Prior Publication Data

US 2024/0371305 A1 Nov. 7, 2024

(51) Int. Cl.

*G09G 3/00* (2006.01)
*G09G 3/20* (2006.01)

(52) U.S. Cl.

CPC .......... *G09G 3/003* (2013.01); *G09G 3/2007* (2013.01); *G09G 2300/0452* (2013.01); *G09G 2310/0297* (2013.01)

(58) Field of Classification Search

None
See application file for complete search history.

(56) References Cited

U.S. PATENT DOCUMENTS

2016/0080645 A1 3/2016 Ohba et al.
2021/0241711 A1* 8/2021 Nagata ................ G09G 3/2096
(Continued)

FOREIGN PATENT DOCUMENTS

CN 103581652 A 2/2014
CN 110632767 A 12/2019
(Continued)

OTHER PUBLICATIONS

International Search Report and Written Opinion for PCT/CN2022/090478 mailed Jan. 17, 2023, with translation of the ISR, 13 pages.

*Primary Examiner* — Parul H Gupta
(74) *Attorney, Agent, or Firm* — Myers Bigel, P.A.

(57) ABSTRACT

The present disclosure provides a display data processing method, including receiving a pixel display data stream, wherein the pixel display data stream includes a plurality of sub-pixel display data corresponding to pixels respectively, converting the pixel display data stream into a pixel island display data stream, wherein the pixel island display data stream includes a plurality of viewpoint display data corresponding to pixel islands respectively, and generating a single-row display datum based on the pixel island display data stream, wherein the viewpoint display data included in the single-row display datum correspond to output channels of a plurality of chips in a one-to-one relationship. The present disclosure also relates to a display data processing device using the method, and a display device based on a (Continued)

multi-viewpoint pixel island architecture which includes the display data processing device.

20 Claims, 15 Drawing Sheets

(56) References Cited

U.S. PATENT DOCUMENTS

| | | | | |
|---|---|---|---|---|
| 2021/0375835 | A1 | 12/2021 | Kang et al. | |
| 2022/0311991 | A1 | 9/2022 | Hong | |
| 2024/0005826 | A1 * | 1/2024 | Zhou | G06F 3/013 |
| 2024/0236291 | A1 * | 7/2024 | Li | G03B 35/18 |

FOREIGN PATENT DOCUMENTS

| | | | | |
|---|---|---|---|---|
| CN | 111613660 | A | 9/2020 | |
| CN | 112233620 | A | 1/2021 | |
| CN | 113409719 | A | 9/2021 | |
| CN | 113782569 | A | 12/2021 | |
| CN | 113870759 | A | 12/2021 | |
| CN | 216249824 | U | 4/2022 | |
| WO | 0232132 | A1 | 4/2002 | |
| WO | WO-2023272719 | A1 * | 1/2023 | G09G 3/001 |

* cited by examiner

DISPLAY DATA PROCESSING METHOD AND DEVICE, AS WELL AS DISPLAY DEVICE

RELATED APPLICATIONS

The present application is a 35 U.S.C. 371 national stage application of PCT International Application No. PCT/CN2022/090478, filed on Apr. 29, 2022, the entire disclosure of which is incorporated herein by reference.

TECHNICAL FIELD

The present invention relates to the field of display technology, and more particularly to a display data processing method applicable to a multi-viewpoint pixel island and a display data processing device using the method, as well as a display device comprising the display data processing device.

BACKGROUND

With the development of display technology, demands for display products with high resolution, high refresh rate and 3D display effect are increasing. Conventional display products are generally designed on the basis of a pixel architecture comprising R, G and B subs-pixels, so it is difficult for them to meet the requirements for high resolution, high refresh rate and 3D display effect. The concept of pixel island has been put forward recently, wherein the high resolution and multi-viewpoint 3D display effect may be achieved by designing a plurality of viewpoints as a pixel island. Furthermore, when a pixel island architecture is used in combination with a multiplex design, a better display effect may be realized.

However, due to the design differences between the pixel island architecture and the RGB pixel architecture, products based on the pixel island architecture need to first process the display data of an image based on the pixel island architecture, or otherwise normal display is in no way possible.

SUMMARY

According to the first aspect of the present disclosure, there is provided a display data processing method, comprising the steps of: receiving a pixel display data stream, wherein the pixel display data stream comprises a plurality of sub-pixel display data corresponding to pixels respectively; converting the pixel display data stream into a pixel island display data stream, wherein the pixel island display data stream comprises a plurality of viewpoint display data corresponding to pixel islands respectively; and generating a single-row display datum based on the pixel island display data stream, wherein the viewpoint display data comprised in the single-row display datum correspond to the output channels of a plurality of chips in a one-to-one relationship.

According to some exemplary embodiments, the step of converting the pixel display data stream into a pixel island display data stream comprises the steps of: acquiring $i \times k$ sub-pixel display data corresponding to i pixels from the pixel display data stream, wherein i and k are both integers greater than 0; marking $m \times n$ sub-pixel display data of the $i \times k$ sub-pixel display data as viewpoint display data corresponding to $m \times n$ viewpoints of m pixel islands, wherein m and n are both integers greater than 0, and $m \times n = i \times k$; and rearranging the viewpoint display data according to an architecture of the pixel islands to convert the pixel display data stream into the pixel island display data stream.

According to some exemplary embodiments, the step of converting the pixel display data stream into a pixel island display data stream comprises the steps of: acquiring $i \times k$ sub-pixel display data corresponding to i pixels from the pixel display data stream, wherein i and k are both integers greater than 0; marking $m \times n$ sub-pixel display data of the $i \times k$ sub-pixel display data as viewpoint display data corresponding to $m \times n$ viewpoints of m pixel islands, wherein m and n are both integers greater than 0, and $m \times n < i \times k$; marking sub-pixel display data, which are not marked as viewpoint display data, of the $i \times k$ sub-pixel display data as dummy viewpoint display data; and rearranging the viewpoint display data and the dummy viewpoint display data according to an architecture of the pixel islands to convert the pixel display data stream into the pixel island display data stream.

According to some exemplary embodiments, the step of generating a single-row display datum based on the pixel island display data stream comprises the steps of: conducting data functionalization for the pixel island display data stream to generate a data-functionalized pixel island display data stream; according to the number of the viewpoint display data corresponding to each chip in the single-row display datum, distinguishing the viewpoint display data corresponding to the chips from the data-functionalized pixel island display data stream; and according to a numbering sequence of the plurality of chips, sequentially rearranging the viewpoint display data corresponding to the chips according to a sequence of chip input ports to generate the single-row display datum.

According to some exemplary embodiments, the step of conducting data functionalization for the pixel island display data stream to generate a data-functionalized pixel island display data stream comprises the steps of: rearranging the pixel island display data stream into an odd-numbered chip display data stream and an even-numbered chip display data stream, wherein the odd-numbered chip display data stream is used to provide the viewpoint display data for odd-numbered chips, and the even-numbered chip display data stream is used to provide the viewpoint display data for even-numbered chips; and wherein the odd-numbered chip display data stream and the even-numbered chip display data stream together constitute the data-functionalized pixel island display data stream.

According to some exemplary embodiments, the step of according to the number of the viewpoint display data corresponding to each chip in the single-row display datum, distinguishing the viewpoint display data corresponding to the chips from the data-functionalized pixel island display data stream comprises the steps of: according to the number of the viewpoint display data corresponding to each chip in the single-row display datum, distinguishing the viewpoint display data corresponding to the odd-numbered chips of the plurality of chips from the odd-numbered chip display data stream; and according to the number of the viewpoint display data corresponding to each chip in the single-row display datum, distinguishing the viewpoint display data corresponding to the even-numbered chips of the plurality of chips from the even-numbered chip display data stream.

According to some exemplary embodiments, the step of conducting data functionalization for the pixel island display data stream to generate a data-functionalized pixel island display data stream comprises the steps of: rearranging the pixel island display data stream into an odd-numbered chip display data stream and an even-numbered chip display data stream, wherein the odd-numbered chip display data stream is used to provide the viewpoint display data for odd-numbered chips, and the even-numbered chip display data stream is used to provide the viewpoint display data for even-numbered chips; rearranging the odd-numbered chip display data stream into odd-numbered chip multiplex display data streams which are of the same number as multiplex groups of the pixel islands, wherein one odd-numbered chip multiplex display data stream is used to provide the viewpoint display data for odd-numbered chips corresponding to one corresponding multiplex group; rearranging the even-numbered chip display data stream into even-numbered chip multiplex display data streams which are of the same number as the multiplex groups of the pixel islands, wherein one even-numbered chip multiplex display data stream is used to provide the viewpoint display data for even-numbered chips corresponding to one corresponding multiplex group; and wherein all the odd-numbered chip multiplex display data streams and all the even-numbered chip multiplex display data streams together constitute the data-functionalized pixel island display data stream.

According to some exemplary embodiments, the step of according to the number of the viewpoint display data corresponding to each chip in the single-row display datum, distinguishing the viewpoint display data corresponding to the chips from the data-functionalized pixel island display data stream comprises the steps of: according to the number of the viewpoint display data corresponding to each chip in the single-row display datum, distinguishing the viewpoint display data provided for the odd-numbered chips of the plurality of chips from all the odd-numbered chip multiplex display data streams; and according to the number of the viewpoint display data corresponding to each chip in the single-row display datum, distinguishing the viewpoint display data provided for the even-numbered chips of the plurality of chips from all the even-numbered chip multiplex display data streams.

According to some exemplary embodiments, the step of conducting data functionalization for the pixel island display data stream to generate a data-functionalized pixel island display data stream comprises the steps of: rearranging the pixel island display data stream into multiplex display data streams which are of the same number as multiplex groups of the pixel islands, wherein one multiplex display data stream is used to provide the viewpoint display data for the pixel island comprised in one corresponding multiplex packet; and all the multiplex display data streams constitute the data-functionalized pixel island display data stream.

According to some exemplary embodiments, the step of generating a single-row display datum based on the pixel island display data stream comprises the steps of: according to the number of the viewpoint display data corresponding to each chip in the single-row display datum, distinguishing the viewpoint display data corresponding to the chips from the pixel island display data stream; and according to a numbering sequence of the plurality of chips, sequentially rearranging the viewpoint display data corresponding to the chips according to a sequence of chip input ports to generate the single-row display datum.

According to some exemplary embodiments, the step of generating a single-row display datum based on the pixel island display data stream comprises the steps of: removing the dummy viewpoint display data from the pixel island display data stream; and generating the single-row display datum based on the pixel island display data stream with the dummy viewpoint display data removed.

According to some exemplary embodiments, the display data processing method further comprises the step of: compensating for the viewpoint display data based on a difference between a bit width of the viewpoint display data comprised in the single-row display datum and a bit width of display data of a display screen when the former is less than the latter.

According to some exemplary embodiments, when the difference between the bit width of the viewpoint display data comprised in the single-row display datum and the bit width of the display data of the display screen is $\alpha$ bits, the viewpoint display data are multiplied by $2^\alpha$ for compensation, wherein $\alpha$ is an integer greater than 0.

According to some exemplary embodiments, the display data processing method further comprises the steps of: caching the single-row display datum; and outputting the single-row display datum in response to a received row enable signal.

According to the second aspect of the present disclosure, there is provided a display data processing device, comprising: a pixel display data stream receiving module configured to receive a pixel display data stream, wherein the pixel display data stream comprises a plurality of sub-pixel display data corresponding to pixels respectively; a display data stream converting module configured to convert the pixel display data stream into a pixel island display data stream, wherein the pixel island display data stream comprises a plurality of viewpoint display data corresponding to pixel islands respectively; and a single-row display datum generating module configured to generate a single-row display datum based on the pixel island display data stream, wherein the viewpoint display data comprised in the single-row display datum correspond to output channels of a plurality of chips in a one-to-one relationship.

According to some exemplary embodiments, the display data processing device further comprises: a display data compensating module configured to compensate for the viewpoint display data based on a difference between a bit width of the viewpoint display data comprised in the single-row display datum and a bit width of display data of a display screen when the former is less than the latter.

According to some exemplary embodiments, the display data processing device further comprises: a display data accessing module configured to cache the single-row display datum, and output the single-row display datum in response to a received row enable signal.

According to some exemplary embodiments, the display data processing device further comprises: an arranging module configured to determine arrangement of pixel display data corresponding to pixels of an image to be displayed.

According to some exemplary embodiments, the display data processing device is achieved based on an FPGA.

According to the third aspect of the present disclosure, there is provided a display device based on a multi-viewpoint pixel island architecture, wherein the display device based on the multi-viewpoint pixel island architecture comprises the display data processing device provided according to the second aspect of the present disclosure.

Therefore, according to the display data processing method and device provided by the present disclosure, converting the display data based on the pixel architecture into the display data based on the architecture of the pixel island may not only realize the normal image display by the display device based on the multi-viewpoint pixel island architecture, but also achieve higher display resolution and multi-viewpoint 3D display effect. In addition, the display data processing method and device provided by the present disclosure may also be compatibly applied to display data processing comprising multiple hardware structures such as MUX design, multiple COF chip design and COF chip parity alternating design through data functionalization, data compensation and data cache readout, thereby being universal for data processing of the display device based on the pixel island architecture.

BRIEF DESCRIPTION OF DRAWINGS

The specific embodiments of the present disclosure will be described in detail in conjunction with the drawings so as to facilitate better knowledge and understanding of more details, features and advantages of the present disclosure; in the drawings.

It shall be understood that the contents shown in the drawings are only for illustration and therefore are not necessary to be drawn in proportion. Furthermore, throughout the drawings, like or similar features are indicated by like or similar reference numerals.

DETAILED DESCRIPTION

The following description provides particular details of exemplary embodiments of the present disclosure so that those skilled in the art may fully understand and implement the technical solutions of the present disclosure.

Figure 1A:
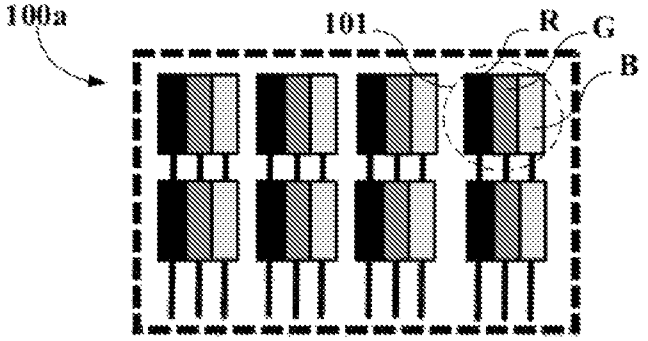
FIG. 1*a* schematically shows a pixel architecture.

FIG. 1*a* schematically shows a pixel architecture. The pixel architecture 100*a* as shown in FIG. 1*a* comprises eight pixels 101, wherein each pixel 101 comprises three sub-pixels, namely, a red sub-pixel R (R sub-pixel), a green sub-pixel G (G sub-pixel) and a blue sub-pixel B (B sub-pixel). A plurality of pixels 101 are arranged in the form of an array so that an image may be displayed based on received RGB sub-pixel display data. It should be understood that the pixel architecture 100*a* as shown in FIG. 1*a* is exemplary, rather than limitative. In some unshown exemplary embodiments of the present disclosure, each pixel may further comprise sub-pixels of other colors, such as a white sub-pixel (W sub-pixel), or each pixel may comprise more than one R sub-pixel, G sub-pixel and/or B sub-pixel.

Figure 1B:
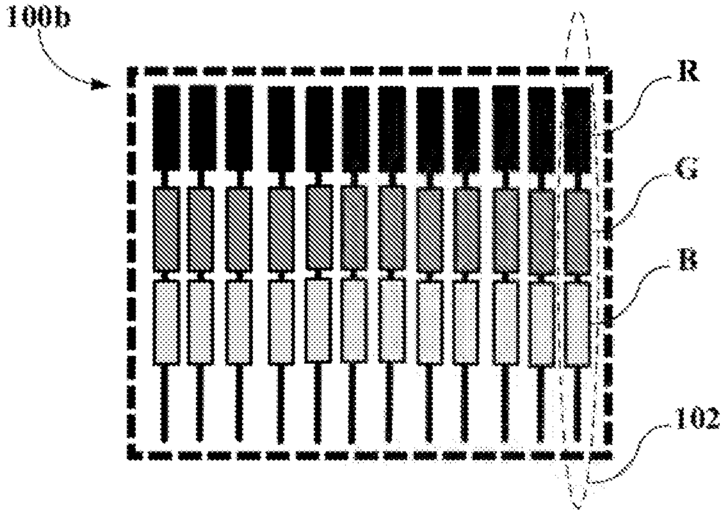
FIG. 1*b* schematically shows a multi-viewpoint pixel island architecture.

FIG. 1*b* schematically shows a multi-viewpoint pixel island architecture. The multi-viewpoint pixel island architecture 100*b* as shown in FIG. 1*b* comprises twelve viewpoints 102, wherein each viewpoint 102 comprises three sub-pixels, i.e., an R sub-pixel, a G sub-pixel and a B sub-pixel. The multi-viewpoint pixel island architecture may achieve the effect of high display resolution and multi-viewpoint 3D display. However, due to the design difference between the pixel island architecture and the pixel architecture, the pixel display data comprising a plurality of sub-pixel display data (e.g., RGB sub-pixel display data) applicable to the pixel architecture need to be converted into the pixel island display data comprising a plurality of viewpoint display data applicable to the multi-viewpoint pixel island architecture. It should be understood that in terms of design, viewpoints in the pixel island correspond to sub-pixels in the pixel.

Figure 1C:
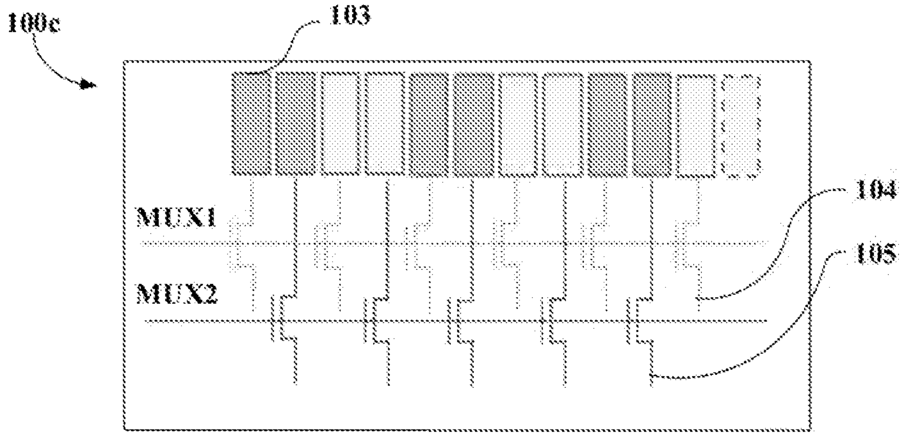
FIG. 1*c* schematically shows a display device based on a pixel island architecture and having an MUX design.

FIG. 1*c* schematically shows a display device based on a pixel island architecture and having an MUX design. As shown in FIG. 1*c*, the display device 100*c* comprises a plurality of pixel islands 103, wherein the plurality of pixel islands 103 are divided into two MUX groups, namely MUX1 and MUX2. Therefore, the MUX design as shown in FIG. 1*c* is an MUX 1:2 design. Each of the plurality of pixel islands 103 comprised in the MUX1 is electrically connected with a corresponding switching circuit element (e.g., a thin film transistor) 104, so that when an enable signal of the MUX1 is received, all the switching circuit elements 104 are turned on, so that the pixel island display data may be transmitted to the corresponding pixel islands 103 comprised in the MUX1. Similarly, each of the plurality of pixel islands 103 comprised in the MUX2 is also electrically connected with a corresponding switching circuit element (e.g., a thin film transistor) 105, so that when an enable signal of the MUX2 is received, all the switching circuit elements 105 are turned on, so that the pixel island display data may be transmitted to the corresponding pixel islands 103 comprised in the MUX2. The multi-viewpoint pixel island architecture in combination with the MUX design may achieve higher display resolution.

Figure 2:
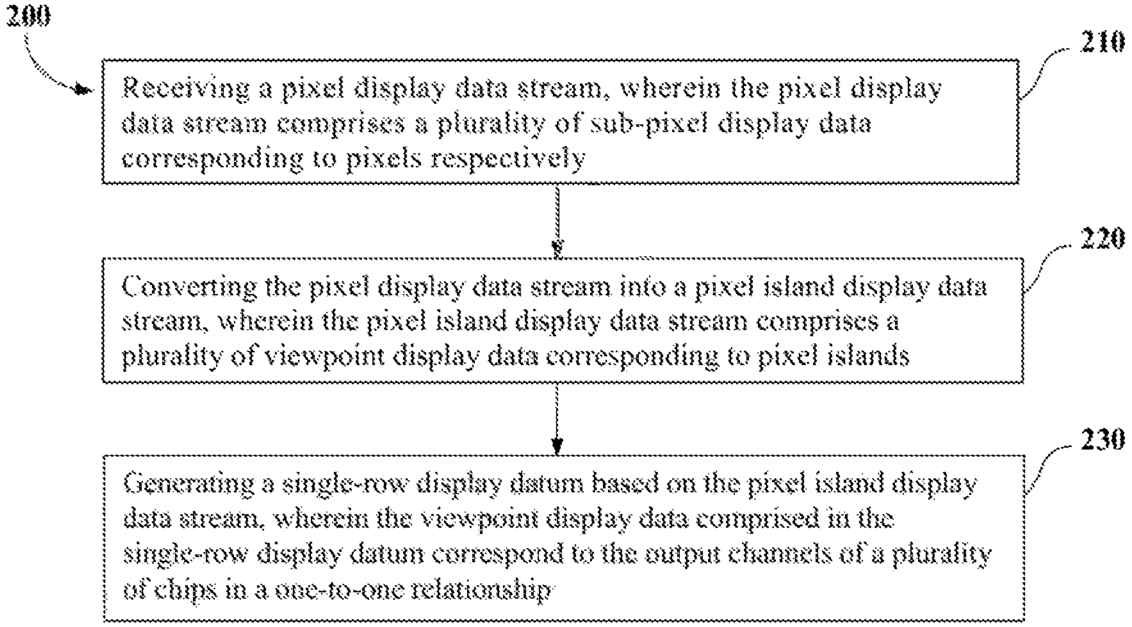
FIG. 2 shows a display data processing method according to some exemplary embodiments of the present disclosure in the form of a flowchart.

FIG. 2 shows a display data processing method according to some exemplary embodiments of the present disclosure in the form of a flowchart. The display data processing method may convert display data applicable to a pixel to display data applicable to a pixel island. As shown in FIG. 2, the display data processing method 200 comprises steps 210, 220 and 230.

In the step 210, a pixel display data stream is received, wherein the pixel display data stream comprises a plurality of sub-pixel display data corresponding to pixels respectively. As a non-limiting example, when the pixels comprise RGB sub-pixels respectively, the pixel display data stream may comprise RGB sub-pixel display data corresponding to the RGB sub-pixels of the pixels. However, it shall be understood that the pixel display data stream may also comprise more types of sub-pixel data. For example, when the pixel further comprises a W sub-pixel, the pixel display data stream may further comprise W sub-pixel display data.

In the step 220, the pixel display data stream is converted into the pixel island display data stream, wherein the pixel island display data stream comprises a plurality of viewpoint display data corresponding to the pixel islands respectively. As explained above, due to the design difference between the pixel island architecture and the pixel architecture, the pixel display data stream comprising a plurality of sub-pixel display data (e.g., RGB sub-pixel display data) need to be converted into the pixel island display data stream comprising a plurality of viewpoint display data so as to apply to the multi-viewpoint pixel island architecture. It should be understood that such a conversion is essentially to establish a one-to-one relationship between the plurality of sub-pixel display data of the pixel display data stream and the plurality of viewpoint display data of the pixel island, so as to convert the pixel display data stream into the pixel island display data stream.

Figure 3:
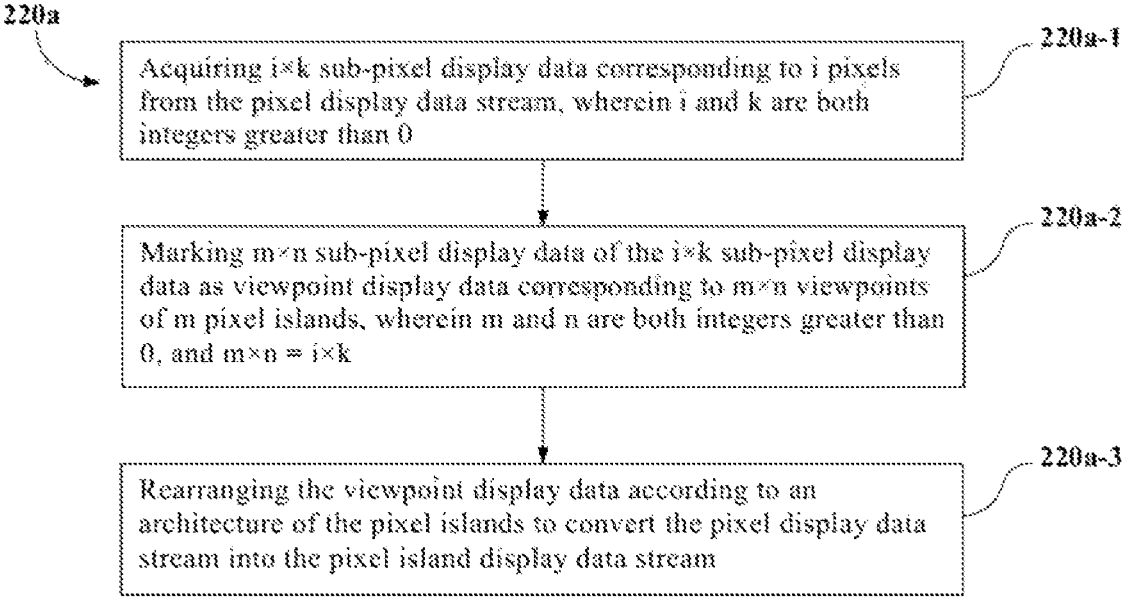
FIG. 3 further shows some details of the display data processing method of FIG. 2 according to some exemplary embodiments of the present disclosure.

FIG. 3 further shows an embodiment of the step 220 of the display data processing method 200 of FIG. 2 according to some exemplary embodiments of the present disclosure. As shown in FIG. 3, the embodiment 220*a* of the step 220 comprises steps 220*a*-1, 220*a*-2 and 220*a*-3.

In the step 220*a*-1, i×k sub-pixel display data corresponding to i pixels are acquired from the pixel display data stream, wherein i and k are both integers greater than 0. In said step, the display datum corresponding to a pixel acquired from a data input channel during each effective clock pulse is intercepted according to the size (e.g., 8-bit width) of a sub-pixel display datum so as to obtain the corresponding sub-pixel display data (for example, for the pixels each comprising RGB sub-pixels, the display datum of each pixel comprises the sub-pixel display data corresponding to an R sub-pixel, a G sub-pixel and a B sub-pixel respectively, namely, an R sub-pixel display datum, a G sub-pixel display datum and a B sub-pixel display datum), and may be respectively determined as, e.g., R1, G1, B1, R2, . . . , according to a particular sequence (e.g., from a low bit to a high bit). Therefore, the sub-pixel display data are extracted from the inputted data stream. It should be understood that in some exemplary embodiments, the sub-pixel display data corresponding to one pixel may be acquired from one data input channel in an effective clock pulse. Thus, when there are a plurality of data input channels (e.g., eight data input channels), the sub-pixel display data corresponding to a plurality of pixels (e.g., eight pixels) may be acquired from the plurality of data input channels in an effective clock pulse. However, in other exemplary embodiments, the sub-pixel display data corresponding to a plurality of pixels (e.g., two or more pixels) may be acquired from one data input channel in an effective clock pulse. It should be understood that the present disclosure does not limit the way to acquire the sub-pixel display data from the data input channel and the number of the acquired sub-pixel display data.

In the step 220*a*-2, m×n sub-pixel display data of the i×k sub-pixel display data are marked as viewpoint display data corresponding to m×n viewpoints of m pixel islands, wherein m and n are both integers greater than 0, and m×n=i×k. That is to say, in said step, the sub-pixel display data of the plurality of pixels acquired from the pixel display data stream in the step 220*a*-1 are matched with the viewpoints of the pixel islands which are of the same number in a one-to-one correspondence. It should be understood that when the sub-pixel display data correspond to the viewpoints in a one-to-one relationship, attention shall be paid to whether the number of the sub-pixel display data acquired in each effective clock pulse matches the number of viewpoints. In the exemplary embodiment as shown in FIG. 3, the number of the sub-pixel display data for the plurality of pixels matches the number of viewpoints comprised in the plurality of pixel islands. The mismatch between the two will be explained in detail.

In the step 220*a*-3, the viewpoint display data are rearranged according to the pixel island architecture to convert the pixel display data stream into the pixel island display data stream. This is because, in the step 220*a*-2, the sub-pixel display data may be sequentially marked as viewpoint display data merely according to the numbering sequence of the viewpoints in the pixel island, and the marking result may not comply with the actual arrangement of the plurality of viewpoints in the pixel island. Thus, it is still necessary to rearrange the marked viewpoint display data according to the pixel island architecture to generate the pixel island display data stream. It should be understood that there may exist different ways to rearrange the viewpoint display data depending on the actual pixel island architecture, which will not be limited herein.

It should also be understood that in the exemplary embodiment as shown in FIG. 3, marking the sub-pixel display data as the viewpoint display data means establishing a mapping relationship between the sub-pixel display data and the viewpoints of the pixel island in a one-to-one correspondence. For example, the m×n sub-pixel display data of the i×k sub-pixel display data may be added with corresponding labels in said step, and the labels map the marked sub-pixel display data to the corresponding viewpoints of the pixel islands, so the marked sub-pixel display data may be used as the viewpoint display data of the viewpoints. Thus, in some non-limiting examples, the labels of all the marked sub-pixel display data together form a label information table, which describes the mapping relationship between each marked sub-pixel display datum and the corresponding viewpoint of the pixel island. In such circumstances, it may be deemed that the sub-pixel display data and the corresponding label information table together constitute the viewpoint display data.

Figure 4:
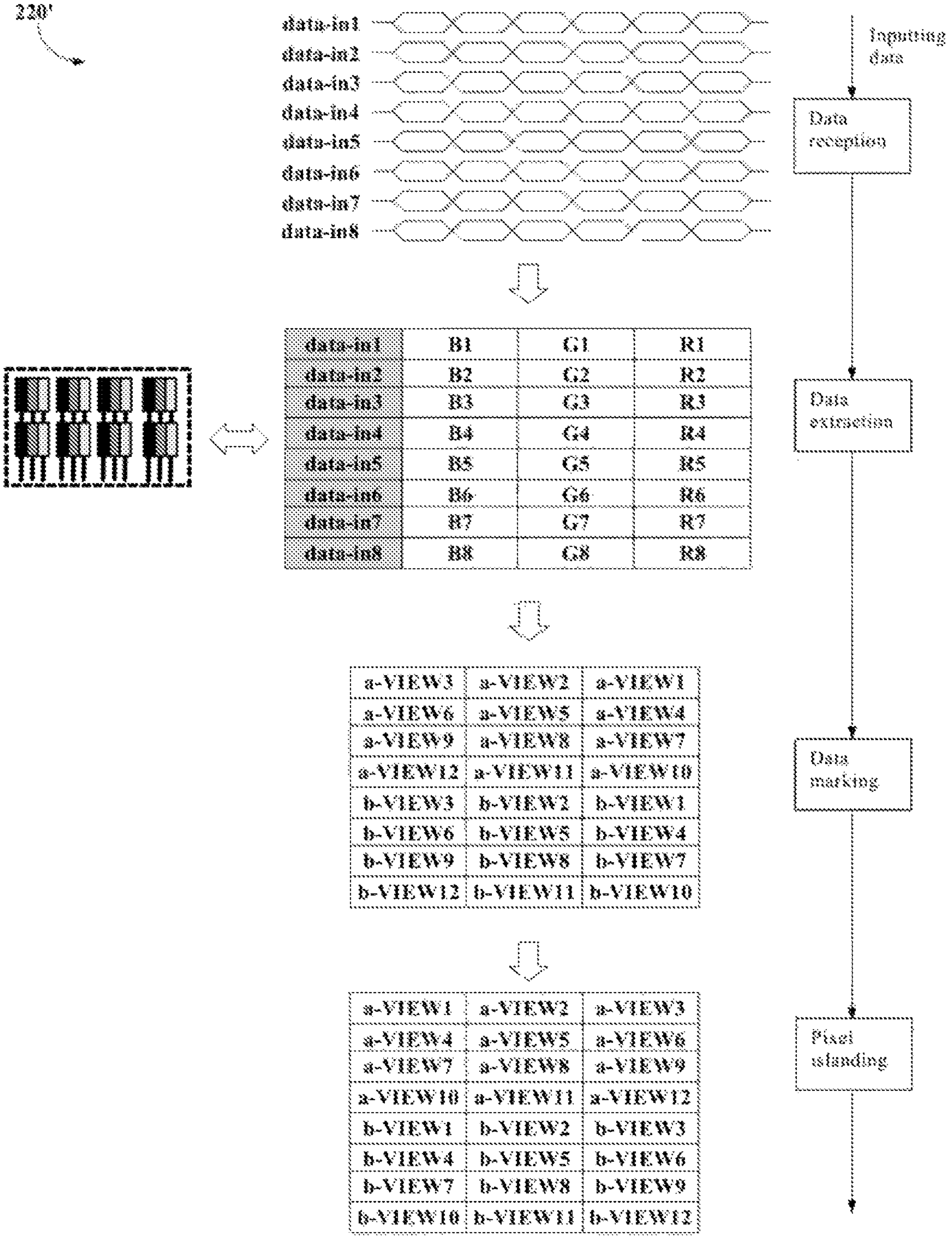
FIG. 4 schematically shows a data stream converting process from a pixel display data stream to a pixel island display data stream according to some exemplary embodiments of the present disclosure.

FIG. 4 schematically shows a data stream converting process from a pixel display data stream to a pixel island display data stream according to some exemplary embodiments of the present disclosure, which corresponds to the method as shown in FIG. 3. As shown in FIG. 4, the data stream converting process 220' comprises four parts: data reception, data extraction, data marking and pixel islanding. In the data reception part, input data may be received from eight data input channels (i.e., data-in1-8) as shown, and constitute the pixel display data stream, which comprises the sub-pixel display data corresponding to the pixels respectively. In the data extraction part, the display datum corresponding to one pixel may be acquired from each data input channel in an effective clock pulse. Thus, the display data corresponding to eight pixels may be acquired from eight data input channels data-in1-8 as shown in FIG. 4 in an effective clock pulse. In the exemplary embodiment as shown in FIG. 4, each pixel comprises a R sub-pixel, a G sub-pixel and a B sub-pixel. Thus, the display datum of each pixel is intercepted according to the size (e.g., 8-bit width) of a sub-pixel display datum so that R sub-pixel display data, G sub-pixel display data and B sub-pixel display data may be obtained, and may be respectively marked as R1, G1, B1, R2, . . . , R8, G8, B8, which are twenty-four sub-pixel display data. In the exemplary embodiment as shown in FIG. 4, each pixel island comprises twelve viewpoints. Thus, in the data marking part, the twenty-four sub-pixel display data may be marked according to the numbering sequence of the viewpoints, so as to establish a one-to-one mapping relationship between the twenty-four sub-pixel display data (i.e., the sub-pixel display data R1, G1, B1, R2, . . . , R8, G8, B8) of the eight pixels and the twenty-four viewpoints (i.e., a-VIEW1, a-VIEW2, . . . , b-VIEW11, b-VIEW12) of the two pixel islands. As shown in FIG. 4, the label information table obtained by marking the twenty-four sub-pixel display data is shown in the data marking part, which describes the correspondence between each of the sub-pixel display data and the viewpoint of the corresponding pixel island. Finally, in the pixel islanding part, the twenty-four viewpoint display data (namely, the twenty-four sub-pixel display data and the corresponding label information table) are rearranged according to the actual pixel island architecture. As shown in FIG. 4, for example, for each data input channel, a low bit viewpoint display datum and a high bit viewpoint display datum may be interchanged. Then, the rearranged viewpoint display data constitute the pixel island display data stream.

Figure 5:
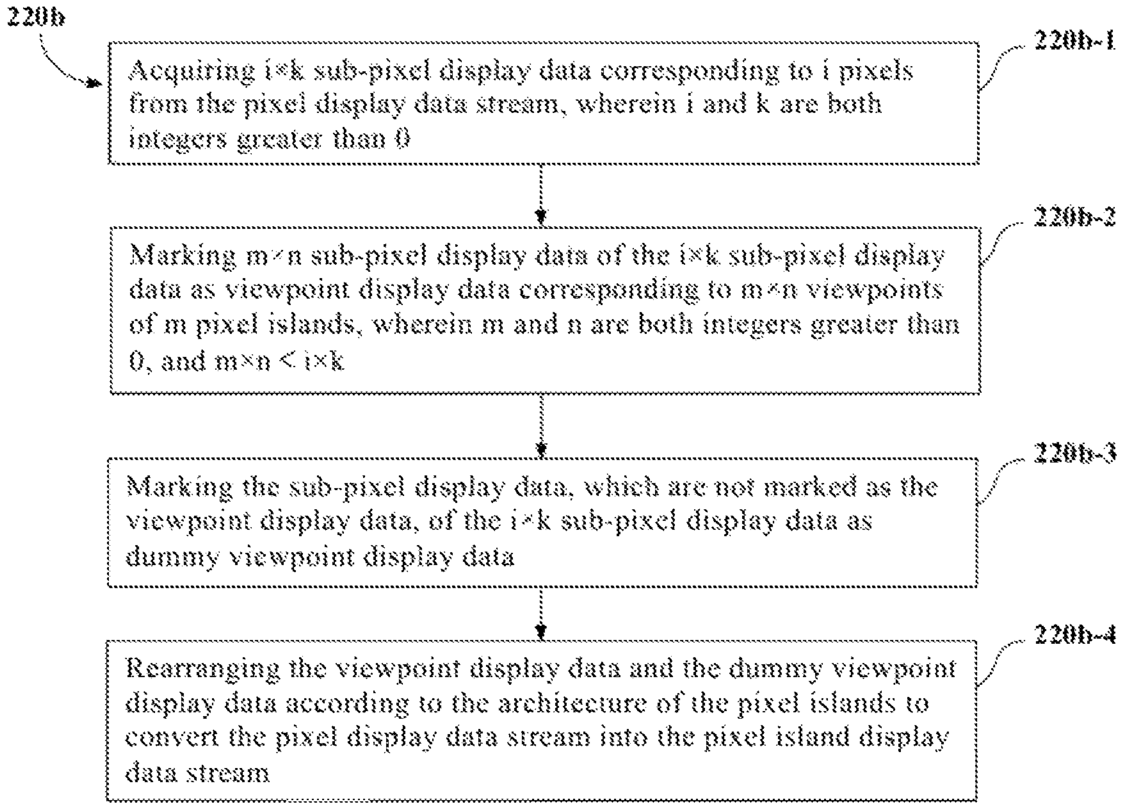
FIG. 5 further shows some details of the display data processing method of FIG. 2 according to some exemplary embodiments of the present disclosure.

FIG. 5 further shows another embodiment of the step 220 of the display data processing method 200 of FIG. 2 according to other exemplary embodiments of the present disclosure. As shown in FIG. 5, the embodiment 220*b* of the step 220 comprises steps 220*b*-1, 220*b*-2, 220*b*-3 and 220*b*-4.

In the step 220*b*-1, i×k sub-pixel display data corresponding to i pixels are acquired from the pixel display data stream, wherein i and k are both integers greater than 0. It should be understood that said step is the same as the step 220*a*-1 as described above and therefore will not be reiterated herein.

In the step 220*b*-2, m×n sub-pixel display data of the i×k sub-pixel display data are marked as viewpoint display data corresponding to m×n viewpoints of m pixel islands, wherein m and n are both integers greater than 0, and m×n<i×k. That is to say, in said step, the sub-pixel display data of the plurality of pixels acquired from the pixel display data stream in the step 220*b*-1 are matched with the viewpoints of the pixel islands which are of the same number in a one-to-one correspondence. In the exemplary embodiment, the number of the sub-pixel display data for the plurality of pixels does not match the number of the viewpoints comprised in the plurality of pixel islands, and the number of the viewpoint display data is less than the number of the sub-pixel display data. Thus, in said step, the m×n sub-pixel display data of the i×k sub-pixel display data are marked.

In the step 220*b*-3, the sub-pixel display data, which are not marked as viewpoint display data, of the i×k sub-pixel display data are marked as dummy viewpoint display data. The function of the dummy viewpoint display data is to work with the m×n viewpoint display data to match the i×k sub-pixel display data in terms of number, thereby facilitating subsequent data functionalization. After data functionalization, the dummy viewpoint display data may be removed in the process of distinguishing the viewpoint display data corresponding to the chips from the pixel island display data stream, which will be expounded later.

In the step 220*b*-4, the viewpoint display data and the dummy viewpoint display data are rearranged together according to the pixel island architecture to convert the pixel display data stream into the pixel island display data stream. Said step is substantially the same as the step 220*a*-3 as described above and therefore will not be reiterated herein.

It should also be understood that in the exemplary embodiment as shown in FIG. 5, marking the sub-pixel display data as the viewpoint display data means establishing a mapping relationship between the number-marked sub-pixel display data and the viewpoints of the pixel island in a one-to-one correspondence. For example, the m×n sub-pixel display data of the i×k sub-pixel display data may be added with corresponding labels in said step, and the labels map the marked sub-pixel display data to the corresponding viewpoints of the pixel islands, so the marked sub-pixel display data may be used as the viewpoint display data of the viewpoints. In addition, the sub-pixel display data, which are not marked as viewpoint display data, of the i×k sub-pixel display data also have corresponding labels, namely labels marking these sub-pixel display data as dummy viewpoint display data. In a non-limiting example, the labels of all the marked sub-pixel display data (comprising the labels of those marked as dummy viewpoint display data) may together form a label information table, which describes the mapping relationship between each of the marked sub-pixel display data and the corresponding viewpoint of the pixel island, as well as between each of the unmarked sub-pixel display data and the corresponding dummy viewpoint display datum.

Figure 6:
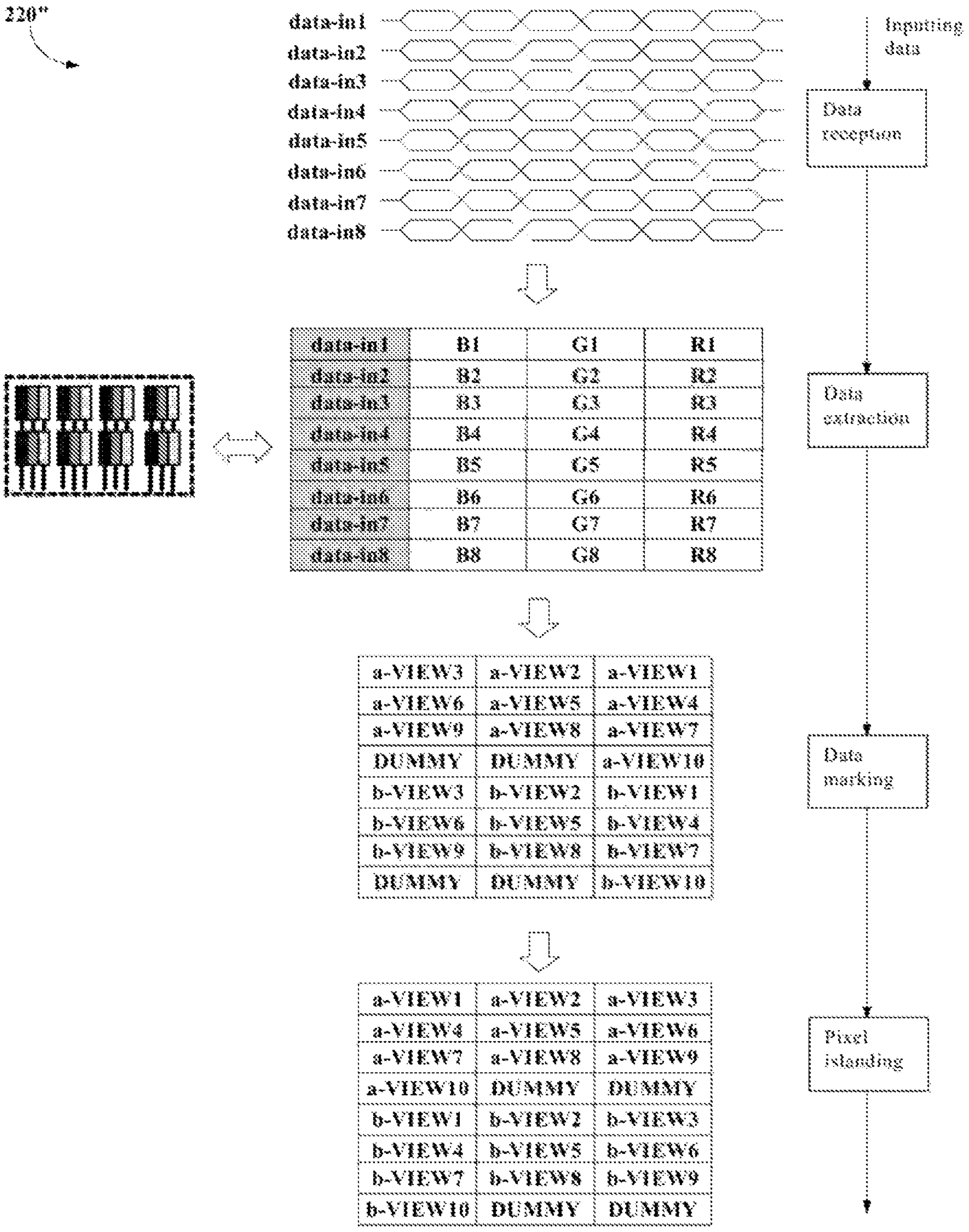
FIG. 6 schematically shows a data stream converting process from a pixel display data stream to a pixel island display data stream according to some exemplary embodiments of the present disclosure.

FIG. 6 schematically shows another data stream converting process from a pixel display data stream to a pixel island display data stream according to some exemplary embodiments of the present disclosure, which corresponds to the method as shown in FIG. 5. As shown in FIG. 6, the data stream converting process 220" also comprises four parts: data reception, data extraction, data marking and pixel islanding. In the data reception part, input data may be received from eight data input channels (i.e., data-in1-8) as shown, and constitute the pixel display data stream, which comprises the sub-pixel display data corresponding to the pixels respectively. In the data extraction part, the display datum corresponding to one pixel may be acquired from each data input channel in an effective clock pulse. Thus, the display data corresponding to eight pixels may be acquired from the eight data input channels data-in1-8 as shown in FIG. 6 in an effective clock pulse. In the exemplary embodiment as shown in FIG. 6, each pixel comprises an R sub-pixel, a G sub-pixel and a B sub-pixel. Thus, the display datum of each pixel are intercepted according to the size (e.g., 8-bit width) of a sub-pixel display datum so that an R sub-pixel display datum, a G sub-pixel display datum and a B sub-pixel display datum may be obtained, and may be respectively marked as R1, G1, B1, R2, . . . , R8, G8, B8, which are twenty-four sub-pixel display data. In the exemplary embodiment as shown in FIG. 6, each pixel island comprises ten viewpoints. Thus, in the data marking part, according to the numbering sequence of the viewpoints, a one-to-one mapping relationship may be established between the twenty sub-pixel display data (i.e., the sub-pixel display data R1, G1, B1, R2, . . . , R4, R5, . . . , B8) of the twenty-four sub-pixel display data and the twenty viewpoint display data (i.e., viewpoint display data a-VIEW1, . . . , a-VIEW10, b-VIEW1, . . . , b-VIEW10) of the two pixel islands. Four unmarked sub-pixel display data of the twenty-four sub-pixel display data are marked as dummy viewpoint display data (i.e., DUMMY labels). Thus, in the data marking part, the twenty-four sub-pixel display data may be marked according to the numbering sequence of the viewpoints, so that the twenty sub-pixel display data of the twenty-four sub-pixel display data correspond to the twenty viewpoints of the two pixel islands in a one-to-one relationship. FIG. 6 shows the label information table (comprising the DUMMY labels marking the dummy viewpoint display data) obtained by marking the twenty-four sub-pixel display data, which describes the correspondence between each sub-pixel display datum and the corresponding viewpoint of the pixel island. Finally, in the pixel islanding part, the marked twenty viewpoint display data and four dummy viewpoint display data (namely, the twenty-four sub-pixel display data and the corresponding label information table) is rearranged according to the actual pixel island architecture. As shown in FIG. 6, for example, for each data input channel, a low bit display datum and a high bit display datum may be interchanged. Then, the rearranged viewpoint display data and dummy viewpoint display data constitute the pixel island display data stream.

Further referring to FIG. 2, in the step 230, a single-row display datum is generated according to the pixel island display data stream, wherein the viewpoint display data comprised in the single-row display datum correspond to the output channels of the plurality of chips in a one-to-one relationship. In the present disclosure, the chip may be a Chip on Film (COF) chip, or a Chip on Glass (COG) chip, or a Chip on Pi (COP) chip, which will not be limited in the present disclosure. The output channels of the chips correspond to the data lines of the pixel island array of the display screen in a one-to-one relationship. Thus, the viewpoint display data comprised in the single-row display datum generated in said step actually correspond to the display data applicable to one row of the pixel island array of the display screen. Therefore, the display data processing method 200 according to the present disclosure may realize the driving and normal display of the display device based on the pixel island architecture.

Figure 7:
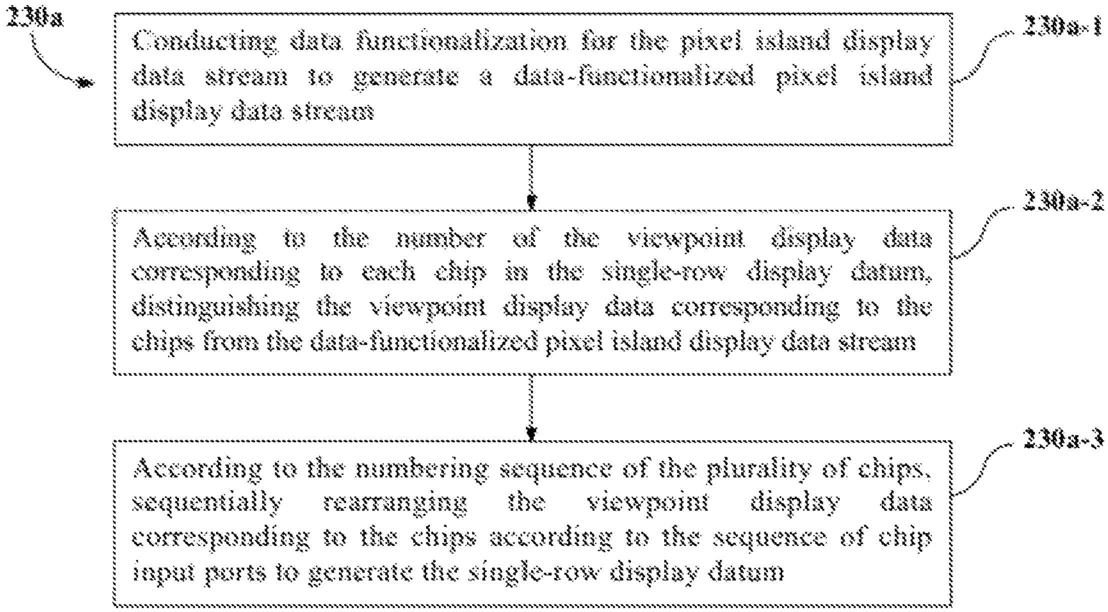
FIG. 7 further shows some details of the display data processing method of FIG. 2 according to some exemplary embodiments of the present disclosure.

FIG. 7 further shows an embodiment of the step 230 of the display data processing method 200 of FIG. 2 according to some exemplary embodiments of the present disclosure. As shown in FIG. 7, the embodiment 230*a* of the step 230 comprises steps 230*a*-1, 230*a*-2 and 230*a*-3.

In the step 230*a*-1, data functionalization of the pixel island display data stream is conducted to generate a data-functionalized pixel island display data stream. Data functionalization is mainly directed to an MUX design (e.g., MUX1:2 or MUX1:3, or a non-conventional MUX design), a multi-chip design, a chip parity alternating design, data line routing of display screens (e.g., parity interleaved routing or sequential routing) and the like. It splits and reconstructs the viewpoint display data comprised in the pixel island display data stream so as to make them compatible with different hardware structures.

In the step 230*a*-2, according to the number of the viewpoint display data corresponding to each chip in the single-row display datum, the viewpoint display data corresponding to the chips are distinguished from the data-functionalized pixel island display data stream.

Figure 14:
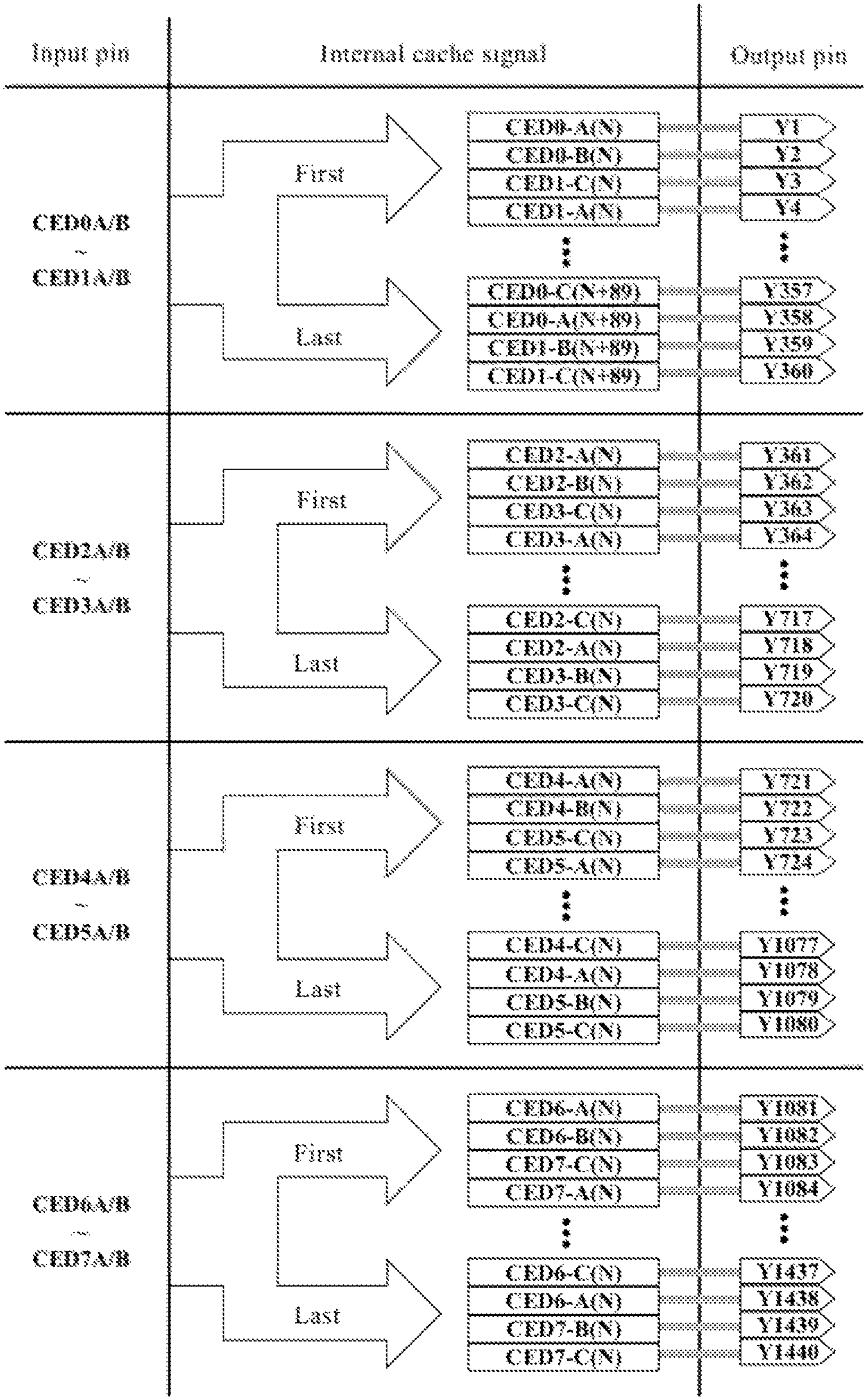
FIG. 14 schematically shows the interface requirements for the chip in a CEDS interface transmission protocol.

Because the output channels of the chips correspond to the data lines of the display screen in a one-to-one relationship, the number of data required for each chip in a row of display data may be determined from the interface requirements for the chip in an interface transmission protocol. FIG. 14 schematically shows the interface requirements for the chip in a CEDS interface transmission protocol. As shown in FIG. 14, each chip has eight input data channels and 1440 output data channels. Therefore, for the display data processing method according to the present disclosure, if 8 chips (such as COF chips) are used, the number of the viewpoint display data comprised in the single-row display datum corresponding to a row of display data required by the display screen should be 1440×8, wherein the number of the viewpoint display data required for each chip is 1440. It should be understood that the interface requirements for the chip based on the CEDS interface transmission protocol described in the present disclosure are only exemplary and not limitative. Therefore, other interface transmission protocols are also possible, which will not be limited herein.

FIGS. 8 to 12 of the present disclosure respectively show some exemplary embodiments of the steps 230*a*-1 and 230*a*-2 as shown in FIG. 7. These exemplary embodiments will be explained below.

Figure 8:
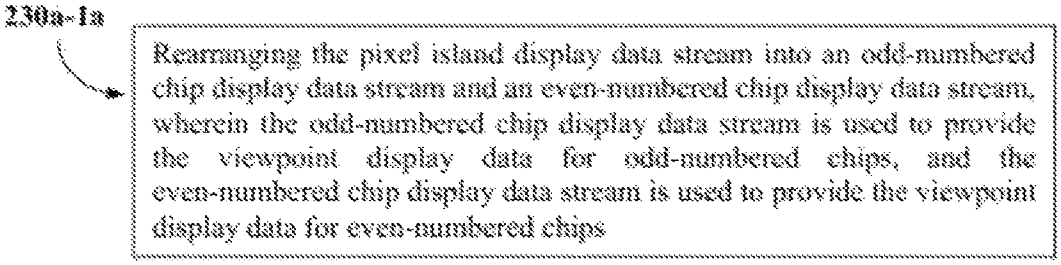
FIG. 8 further shows some details of the display data processing method of FIG. 7 according to some exemplary embodiments of the present disclosure.

FIG. 8 further shows an embodiment of the step 230*a*-1 as shown in FIG. 7 according to some exemplary embodiments of the present disclosure. As shown in FIG. 8, the embodiment 230*a*-1*a* of the step 230*a*-1 comprises the steps of: rearranging the pixel island display data stream into an odd-numbered chip display data stream and an even-numbered chip display data stream, wherein the odd-numbered chip display data stream is used to provide the viewpoint display data for odd-numbered chips, and the even-numbered chip display data stream is used to provide the viewpoint display data for even-numbered chips. The odd-numbered chip display data stream and the even-numbered chip display data stream together constitute the data-functionalized pixel island display data stream. Thus, the function of the embodiment 230*a*-1*a* is to split and reconstruct the viewpoint display data comprised in the pixel island display data stream in view of the numbering parity of chips in the chip parity alternating design, so as to adapt to a hardware structure comprising the chip parity alternating design.

Figure 9:
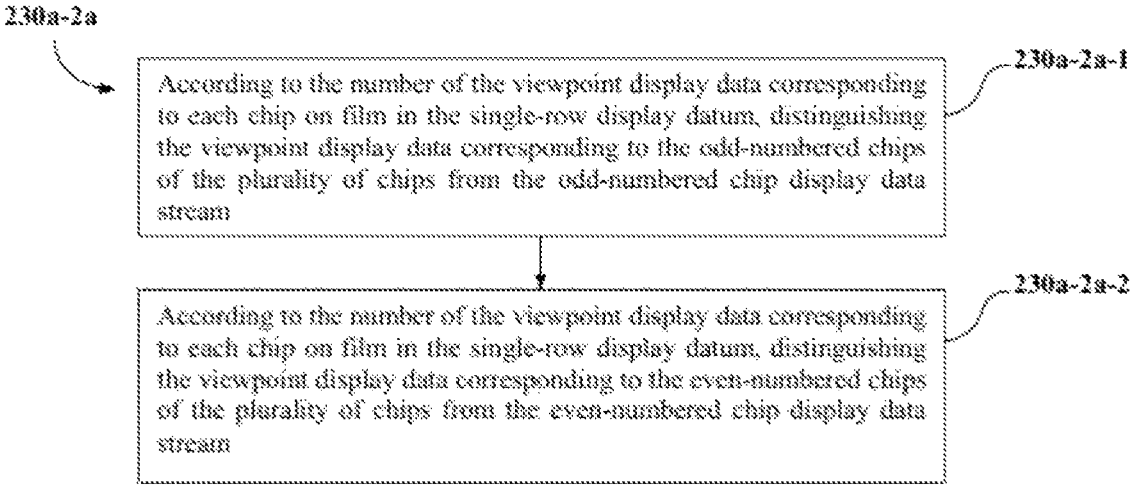
FIG. 9 further shows some details of the display data processing method of FIG. 7 according to some exemplary embodiments of the present disclosure.

FIG. 9 further shows an embodiment of the step 230*a*-2 as shown in FIG. 7 according to some exemplary embodiments of the present disclosure. As shown in FIG. 9, the embodiment 230*a*-2*a* of the step 230*a*-2 comprises steps 230*a*-2*a*-1 and 230*a*-2*a*-2. In the step 230*a*-2*a*-1, according to the number of the viewpoint display data corresponding to each chip in the single-row display datum, the viewpoint display data corresponding to the odd-numbered chips of the plurality of chips are distinguished from the odd-numbered chip display data streams. In the step 230*a*-2*a*-2, according to the number of the viewpoint display data corresponding to each chip in the single-row display datum, the viewpoint display data corresponding to the even-numbered chips of the plurality of chips are distinguished from the even-numbered chip display data streams. Thus, the embodiment 230*a*-2*a* as shown in FIG. 9 is actually the subsequent processing of the odd-numbered chip display data streams and the even-numbered chip display data streams acquired in the embodiment 230*a*-1*a* as shown in FIG. 8, namely, distinguishing the viewpoint display data of the chips from the odd-numbered chip display data stream and the even-numbered chip display data stream.

Figure 10:
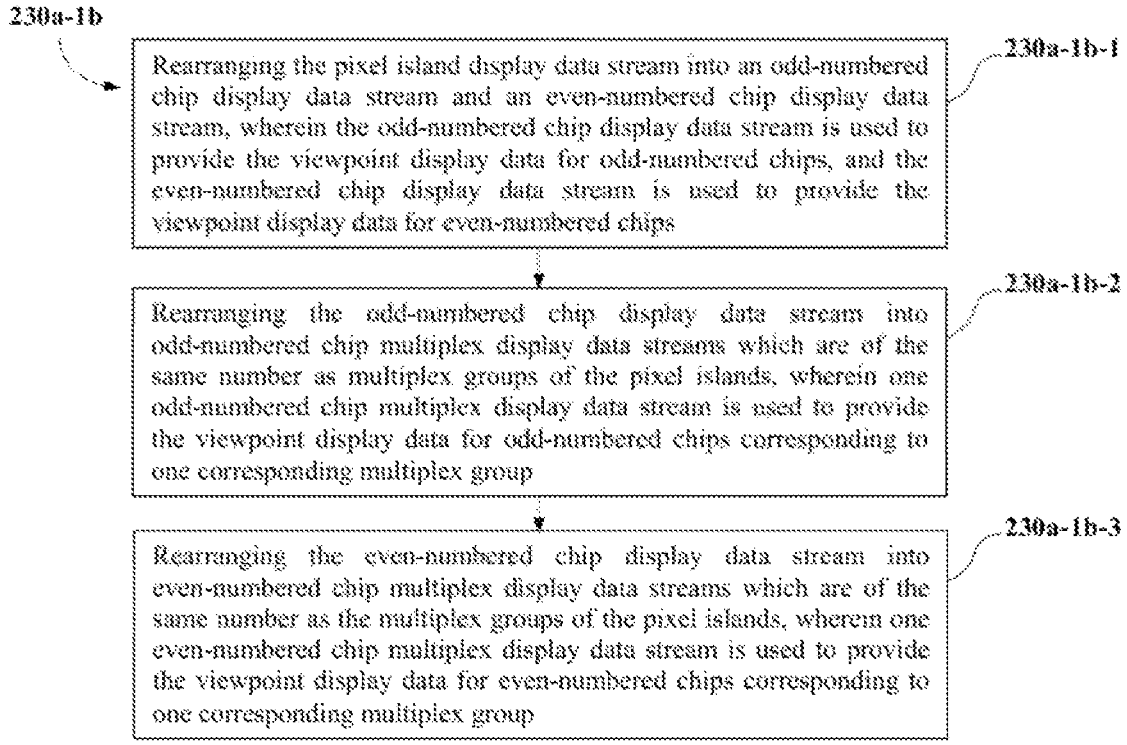
FIG. 10 further shows some details of the display data processing method of FIG. 7 according to some exemplary embodiments of the present disclosure.

FIG. 10 further shows another embodiment of the step 230*a*-1 as shown in FIG. 7 according to some exemplary embodiments of the present disclosure. As shown in FIG. 10, the embodiment 230*a*-1*b* of the step 230*a*-1 comprises steps 230*a*-1*b*-1, 230*a*-1*b*-2 and 230*a*-1*b*-3. In the step 230*a*-1*b*-1, the pixel island display data stream is rearranged into an odd-numbered chip display data stream and an even-numbered chip display data stream, wherein the odd-numbered chip display data stream is used to provide the viewpoint display data for odd-numbered chips, and the even-numbered chip display data stream is used to provide the viewpoint display data for even-numbered chips. Said step is substantially the same as the step 230*a*-1*a* as described above. In the step 230*a*-1*b*-2, the odd-numbered chip display data stream is rearranged into odd-numbered chip multiplex display data streams which are of the same number as multiplex groups of the pixel islands, wherein one odd-numbered chip multiplex display data stream is used to provide the viewpoint display data for the odd-numbered chips corresponding to one corresponding multiplex group. In the step 230*a*-1*b*-3, the even-numbered chip display data stream is rearranged into even-numbered chip multiplex display data streams which are of the same number as the multiplex groups of the pixel islands, wherein one even-numbered chip multiplex display data stream is used to provide the viewpoint display data for the even-numbered chips corresponding to one corresponding multiplex group. The odd-numbered chip multiplex display data streams and the even-numbered chip multiplex display data streams together constitute the data-functionalized pixel island display data stream. Thus, the function of the embodiment 230*a*-1*b* is to split and reconstruct the viewpoint display data comprised in the pixel island display data stream in view of the numbering parity of chips in the chip parity alternating design and the MUX design of the display screen, so as to adapt to a hardware structure comprising the chip parity alternating design and the MUX design.

Figure 11:
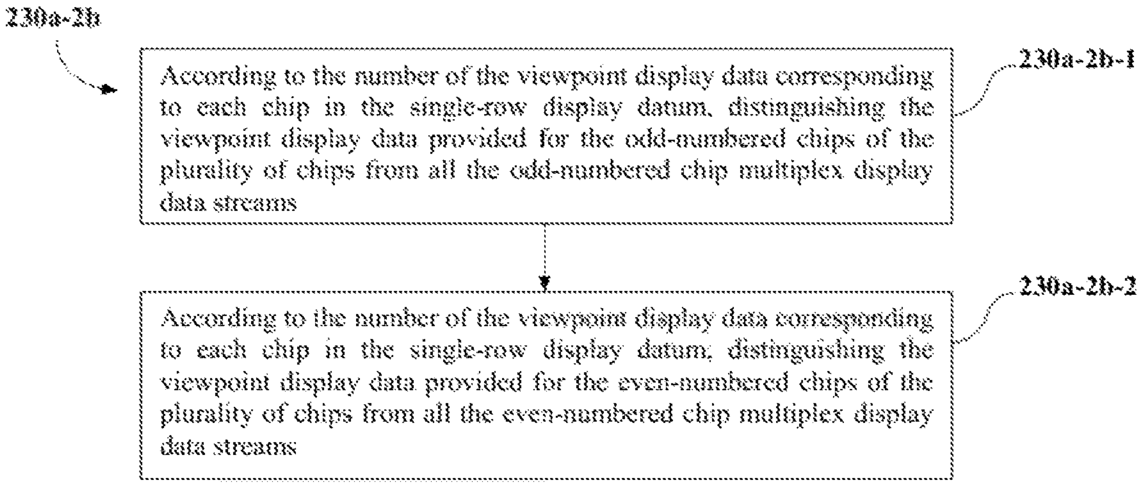
FIG. 11 further shows some details of the display data processing method of FIG. 7 according to some exemplary embodiments of the present disclosure.

FIG. 11 further shows another embodiment of the step 230*a*-2 as shown in FIG. 7 according to some exemplary embodiments of the present disclosure. As shown in FIG. 11, the embodiment 230*a*-2*b* of the step 230*a*-2 comprises steps 230*a*-2*b*-1 and 230*a*-2*b*-2. In the step 230*a*-2*b*-1, according to the number of the viewpoint display data corresponding to each chip in the single-row display datum, the viewpoint display data provided for the odd-numbered chips of the plurality of chips are distinguished from all the odd-numbered chip multiplex display data streams. In the step 230*a*-2*b*-2, according to the number of the viewpoint display data corresponding to each chip in the single-row display datum, the viewpoint display data provided for the even-numbered chips of the plurality of chips are distinguished from all the even-numbered chip multiplex display data streams. Thus, the embodiment 230*a*-2*b* as shown in FIG. 11 is actually the subsequent processing of the odd-numbered chip multiplex display data streams and the even-numbered chip multiplex display data streams acquired in the embodiment 230*a*-1*b* as shown in FIG. 10, namely, distinguishing the viewpoint display data of the chips from the odd-numbered chip multiplex display data streams and the even-numbered chip multiplex display data streams.

Figure 12:
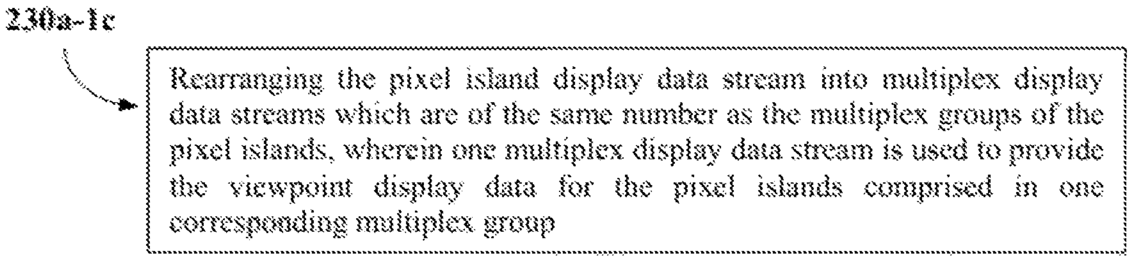
FIG. 12 further shows some details of the display data processing method of FIG. 7 according to some exemplary embodiments of the present disclosure.

FIG. 12 further shows another embodiment of the step 230*a*-1 as shown in FIG. 7 according to some exemplary embodiments of the present disclosure. As shown in FIG. 12, the embodiment 230*a*-1*c* of the step 230*a*-1 comprises the steps of: rearranging the pixel island display data stream into multiplex display data streams which are of the same number as the multiplex groups of the pixel islands, wherein one multiplex display data stream is used to provide the viewpoint display data for the pixel islands comprised in one corresponding multiplex group. Thus, the function of the embodiment 230*a*-1*c* as shown in FIG. 12 is to split and reconstruct the viewpoint display data comprised in the pixel island display data stream in view of the MUX design of the display screen, so as to adapt to, e.g., the MUX design of the display screen. Accordingly, according to the number of the viewpoint display data corresponding to each chip in the single-row display datum, the viewpoint display data provided for the chips are distinguished from all the multiplex display data streams.

Figure 15:
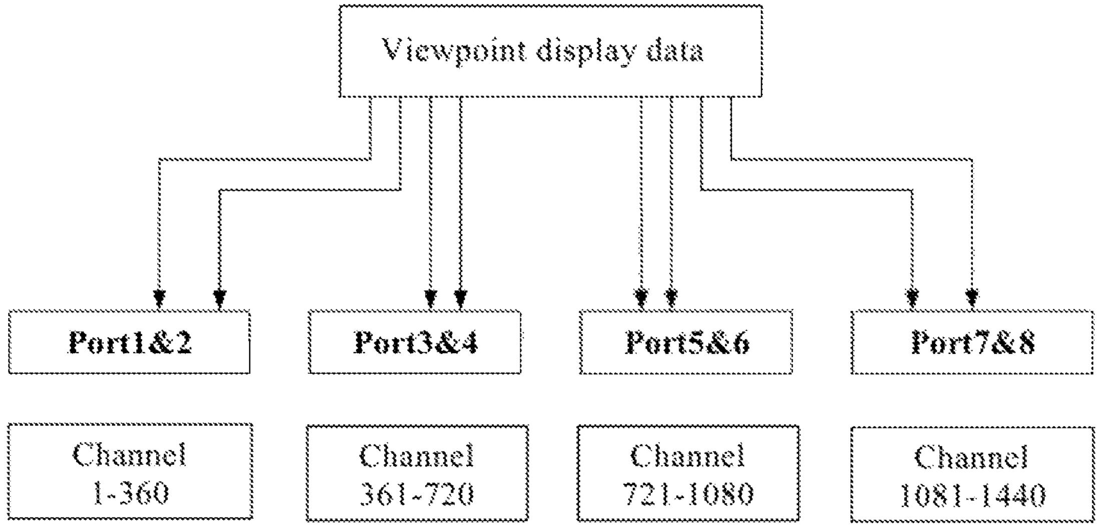
FIG. 15 schematically shows a method for rearranging the viewpoint display data comprised in the pixel island display data stream according to the interface requirements for the chip as shown in FIG. 14.

Back to FIG. 7, in the step 230*a*-3, according to the numbering sequence of the plurality of chips, the viewpoint display data corresponding to the chips are sequentially rearranged according to the sequence of chip input ports to generate the single-row display datum. In combination with FIGS. 14 and 15, FIG. 14 schematically shows the interface requirements for the chip in a CEDS interface transmission protocol, and FIG. 15 schematically shows a method for rearranging the viewpoint display data according to the interface requirements for the chip as shown in FIG. 14. As shown in FIG. 14, each chip has eight input data channels (namely, CED0A/B to CED7A/B) and 1440 output data channels (Y1 to Y1440), wherein the data of the input data channels CED0A/B and CED1A/B are transmitted to the output data channels Y1 to Y360, the data of the input data channels CED2A/B and CED3A/B are transmitted to the output data channels Y361 to Y720, the data of the input data channels CED4A/B and CED5A/B are transmitted to the output data channels Y721 to Y1080, and the data of the input data channels CED6A/B and CED7A/B are transmitted to the output data channels Y1081 to Y1440. According to the interface requirements for the chip as shown in FIG. 14, the viewpoint display data corresponding to the chips need to be rearranged according to the output data channels. Correspondingly, FIG. 15 shows a rearranging method, wherein the viewpoint display data corresponding to the chips are rearranged to eight port data streams Port 1 to Port 8, wherein the port data streams Port 1 and Port 2 transmit the viewpoint display data provided for channels Y1 to Y360, the port data streams Port 3 and Port 4 transmit the viewpoint display data provided for channels Y361 to Y720, the port data streams Port 5 and Port 6 transmit the viewpoint display data provided for channels Y721 to Y1080, and the port data streams Port 7 and Port 8 transmit the viewpoint display data provided for channels Y1081 to Y1440. The viewpoint display data corresponding to the chips transmitted after rearrangement according to the chip input ports constitute the single-row display datum, which correspond to a row of display data provided for the display screen.

Figure 13:
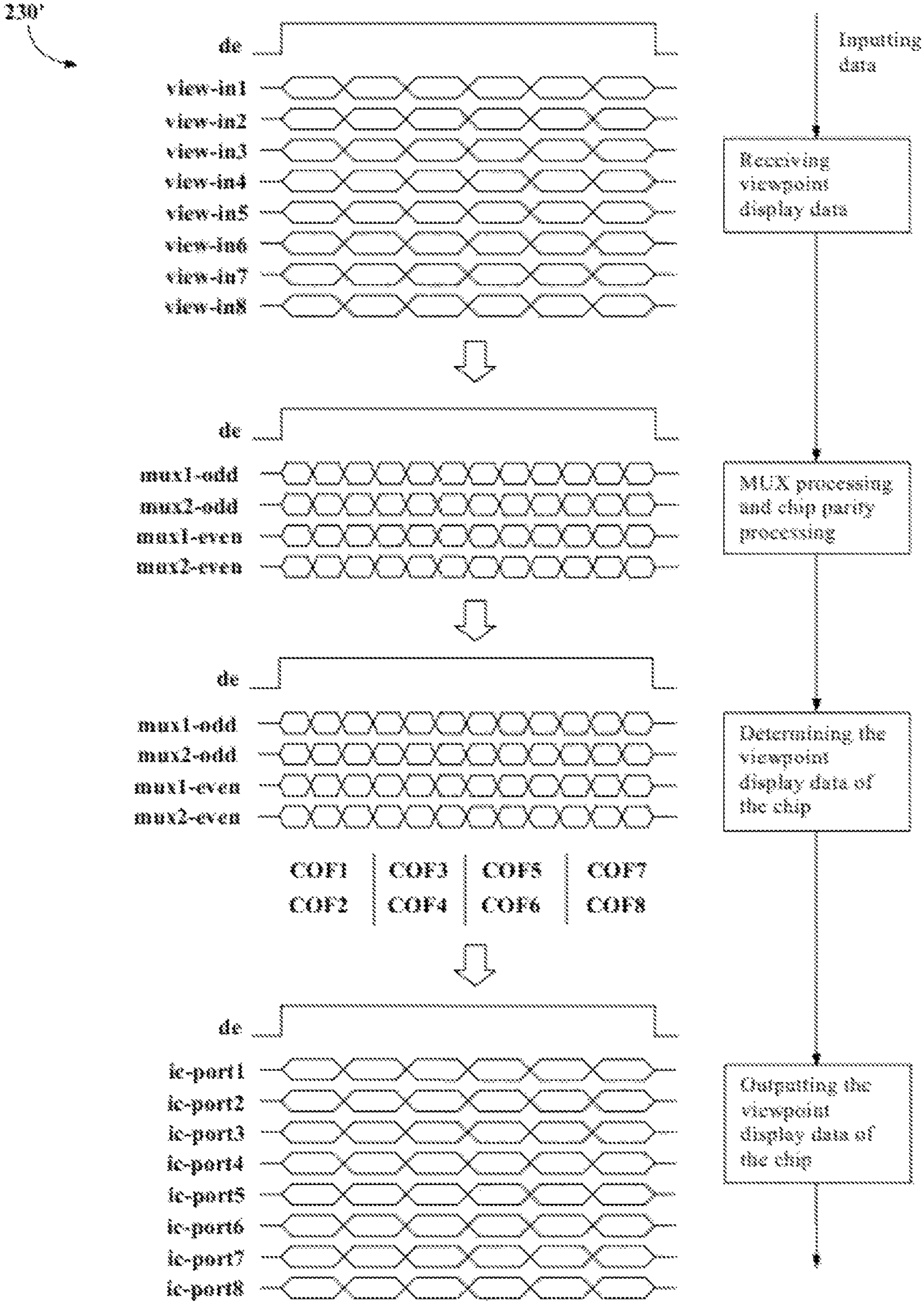
FIG. 13 schematically shows a data functionalizing process for a pixel island display data stream according to some exemplary embodiments of the present disclosure.

FIG. 13 schematically shows a data-functionalizing process for a pixel island display data stream according to some exemplary embodiments of the present disclosure. As shown in FIG. 13, the data-functionalizing process 230' conducts data functionalization for the pixel island display data stream in view of the hardware structure comprising a COF chip parity alternating design and an MUX1:2 design. In a viewpoint display data reception part, the viewpoint display data are received from eight viewpoint display data input channels view-in1 to view-in8 in an effective clock pulse de. Then, in an MUX processing and chip parity processing part, in view of the MUX1:2 design and the COF chip numbering parity, the viewpoint display data are rearranged from the eight viewpoint display data input channels view-in1 to view-in8 to four processed viewpoint display data channels, namely mux1-odd, mux2-odd, mux1-even and mux2-even, wherein the processed viewpoint display data channel mux1-odd provides the viewpoint display data for the multiplex group MUX1 of the odd-numbered chips, the processed viewpoint display data channel mux2-odd provides the viewpoint display data for the multiplex group MUX2 of the odd-numbered chips, the processed viewpoint display data channel mux1-even provides the viewpoint display data for the multiplex group MUX1 of the even-numbered chips, and the processed viewpoint display data channel mux2-even provides the viewpoint display data for the multiplex group MUX2 of the even-numbered chips. It shall be understood that in comparison with the eight viewpoint display data input channels view-in1 to view-in8, the four processed viewpoint display data channels mux1-odd, mux2-odd, mux1-even and mux2-even each provide two times of the number of the viewpoint display data in an effective clock pulse de. For example, the number of the viewpoint display data provided in an effective clock pulse de by each of the eight viewpoint display data input channels view-in1 to view-in8 is 24 bits, and the number of the viewpoint display data provided in an effective clock pulse de by each of the four processed viewpoint display data channels mux1-odd, mux2-odd, mux1-even and mux2-even is 48 bits. In a part of determining the viewpoint display data of the chip, as stated above, the viewpoint display data corresponding to the chips may be distinguished from the data functionalized pixel island display data stream according to the number of the viewpoint display data corresponding to the chips (e.g., chips COF1 to COF8) in the single-row display datum. For example, the viewpoint display data of the odd-numbered chips COF1, COF3, COF5 and COF7 are distinguished from the processed viewpoint display data channels mux1-odd and mux2-odd, and the viewpoint display data of the even-numbered chips COF2, COF4, COF6 and COF8 are distinguished from the processed viewpoint display data channels mux1-even and mux2-even. In a part of outputting the viewpoint display data of the chip, according to the interface requirements for chip in the CEDS interface transmission protocol, the viewpoint display data of the chips COF1 to COF8 are rearranged according to the sequence of the chip input ports to generate the single-row display datum. For example, the viewpoint display data of the chips are rearranged into chip port data streams ic-port 1 to ic-port8 respectively. For the details of the chip port data streams ic-port 1 to ic-port8, reference may be made to the previous description of FIGS. 14 and 15, which will not be reiterated. Thus, the viewpoint display data corresponding to the chips after rearrangement according to the sequence of the chip input ports constitute the single-row display datum, which corresponds to a row of display data provided for the display screen.

Figure 16:
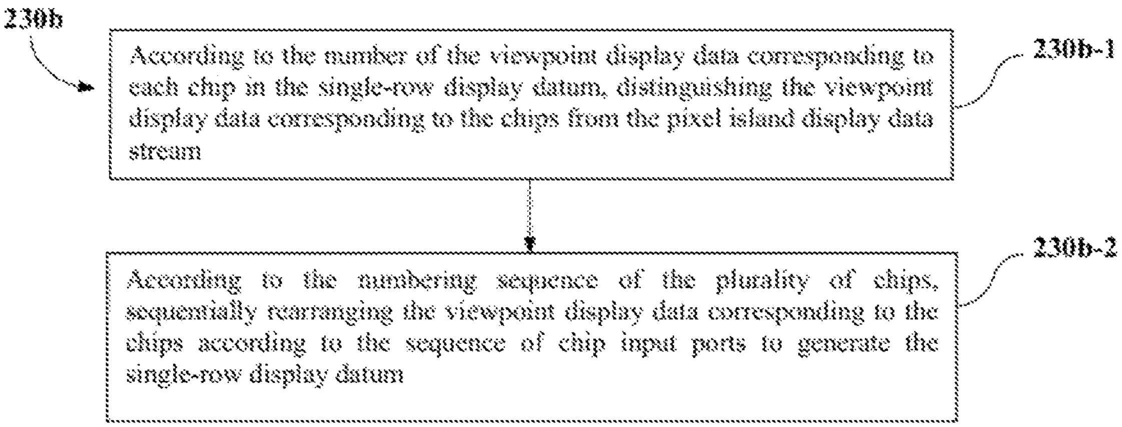
FIG. 16 further shows some details of the display data processing method of FIG. 2 according to some exemplary embodiments of the present disclosure.

FIG. 16 further shows another embodiment of the step 230 of the display data processing method 200 of FIG. 2 according to some exemplary embodiments of the present disclosure. As shown in FIG. 16, the embodiment **230*b* of the step 230 comprises steps 230*b*-1 and 230*b*-2. In the step 230*b*-1, according to the number of the viewpoint display data corresponding to each chip in the single-row display datum, the viewpoint display data corresponding to the chips are distinguished from the pixel island display data stream. The step 230*b*-2 is the same as the step 230*a*-3 as previously described, and will not be reiterated herein. It should be understood that the embodiment 230*b* as shown in FIG. 16** is directed to the situation where the pixel island display data stream does not need to be data functionalized. Thus, it is only necessary to directly distinguish the viewpoint display data corresponding to the chips from the pixel island display data stream.

In addition, it should also be understood that as for the exemplary embodiment as shown in FIGS. 5 and 6, since there is a situation in which the sub-pixel display data are marked as dummy viewpoint display data in the process of converting the pixel display data stream into the pixel island display data stream, as for the comprised dummy viewpoint display data, the step 230 of the display data processing method 200 as shown in FIG. 2 may also be implemented as comprising the following steps of: removing the dummy viewpoint display data from the pixel island display data stream; and generating the single-row display datum based on the pixel island display data stream with the dummy viewpoint display data removed.

Figure 17:
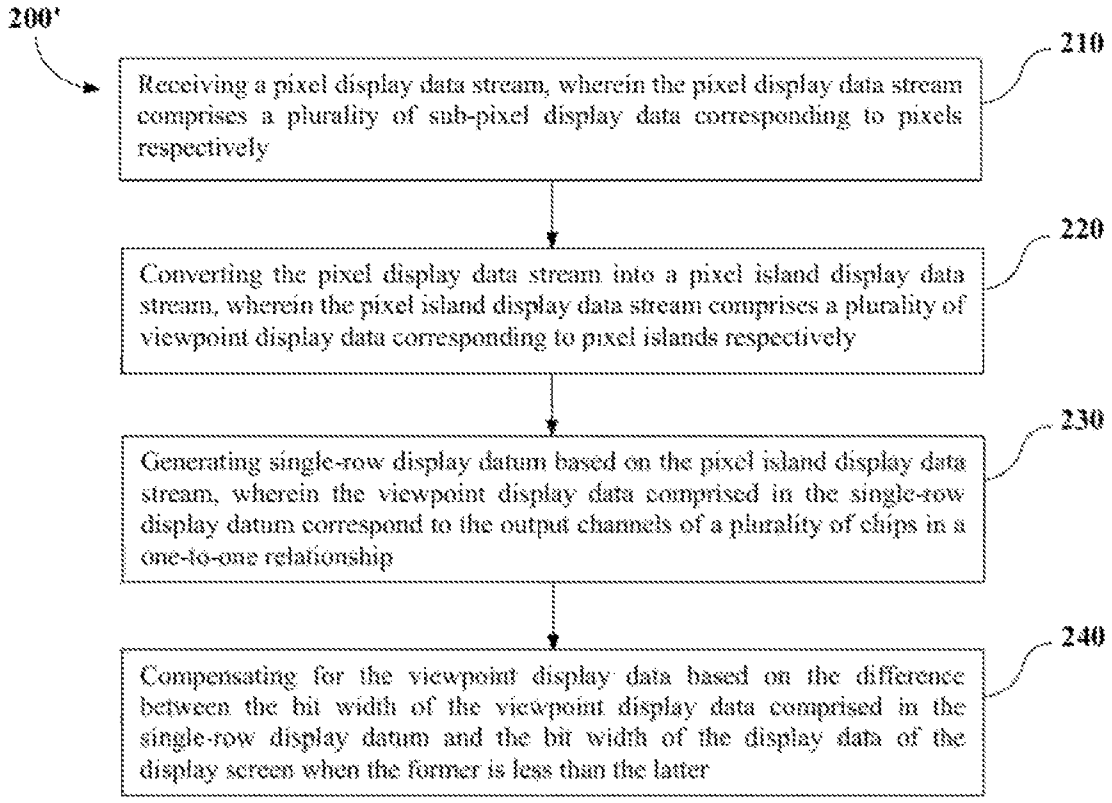
FIG. 17 shows a further display data processing method according to some exemplary embodiments of the present disclosure in the form of a flowchart.

FIG. 17 shows a further display data processing method according to some exemplary embodiments of the present disclosure in the form of a flowchart. As shown in FIG. 17, the display data processing method 200' comprises steps 210, 220, 230 and 240. The steps 210, 220 and 230 are the same as the corresponding steps of the display data processing method 200 as already described in detail and will not be reiterated herein. In the step 240, when the bit width of the viewpoint display datum is less than the bit width of the display datum of the display screen, the viewpoint display datum are compensated due to the difference between the two. The display data processing method 200' is applicable to the situation that the display device based on the pixel island architecture does not match the common display device in terms of color depth. For example, the front-end image data of the current host machine are usually 8-bit wide, whereas the display device based on the pixel island architecture is generally designed to have a high contrast of 10-bit color depth. Thus, it is necessary to compensate for the viewpoint display data from 8-bit wide to 10-bit wide so as to achieve color depth matching. In the display data processing method 200', the color depth matching may be achieved by data compensation for the difference in color depth between the two.

Figure 18:
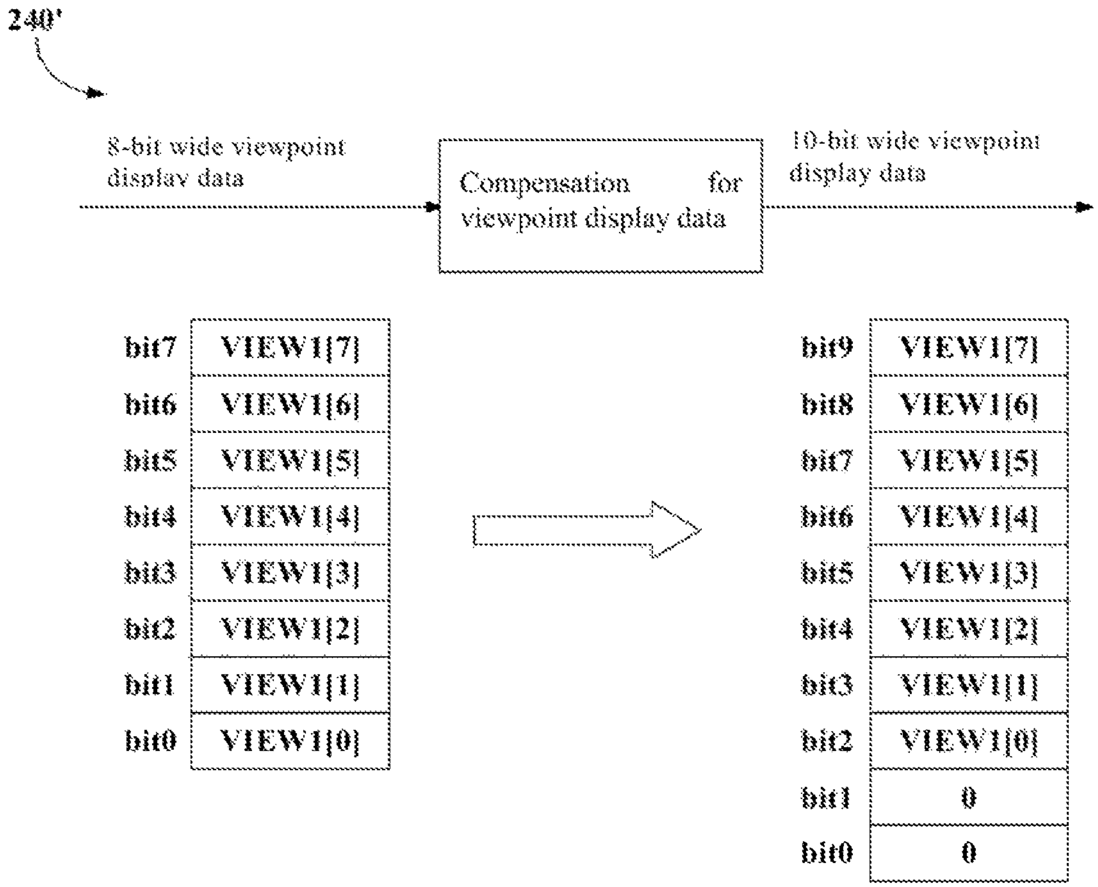
FIG. 18 schematically shows a process for compensating for the viewpoint display data.

In combination with FIG. 18, it schematically shows a process for compensating for the viewpoint display data. As shown in FIG. 18, in the compensation process 240', the 8-bit wide viewpoint display datum VIEW1 is inputted, comprising 8 bit values VIEW1[0] to VIEW1[7] from bit 0 to bit 7, and the 10-bit wide viewpoint display datum is outputted, wherein 8 bit values VIEW1[7] to VIEW1[0] are sequentially written in sequence from the high bit to the low bit of the 10-bit width, and the bit values of the rest two bits, i.e. bit1 and bit0, may be 0, thereby obtaining the compensated 10-bit wide viewpoint display datum. It should be understood that the compensation process 240' as shown in FIG. 18 is essentially to shift the 8-bit wide viewpoint display datum to a high bit, and if the shifted bits are α, it is equivalent to multiplying the 8-bit wide viewpoint display datum by $2^{\alpha}$, wherein α is an integer greater than 0. It should be understood that other suitable compensation manners are also possible, which will not be limited herein.

Figure 19:
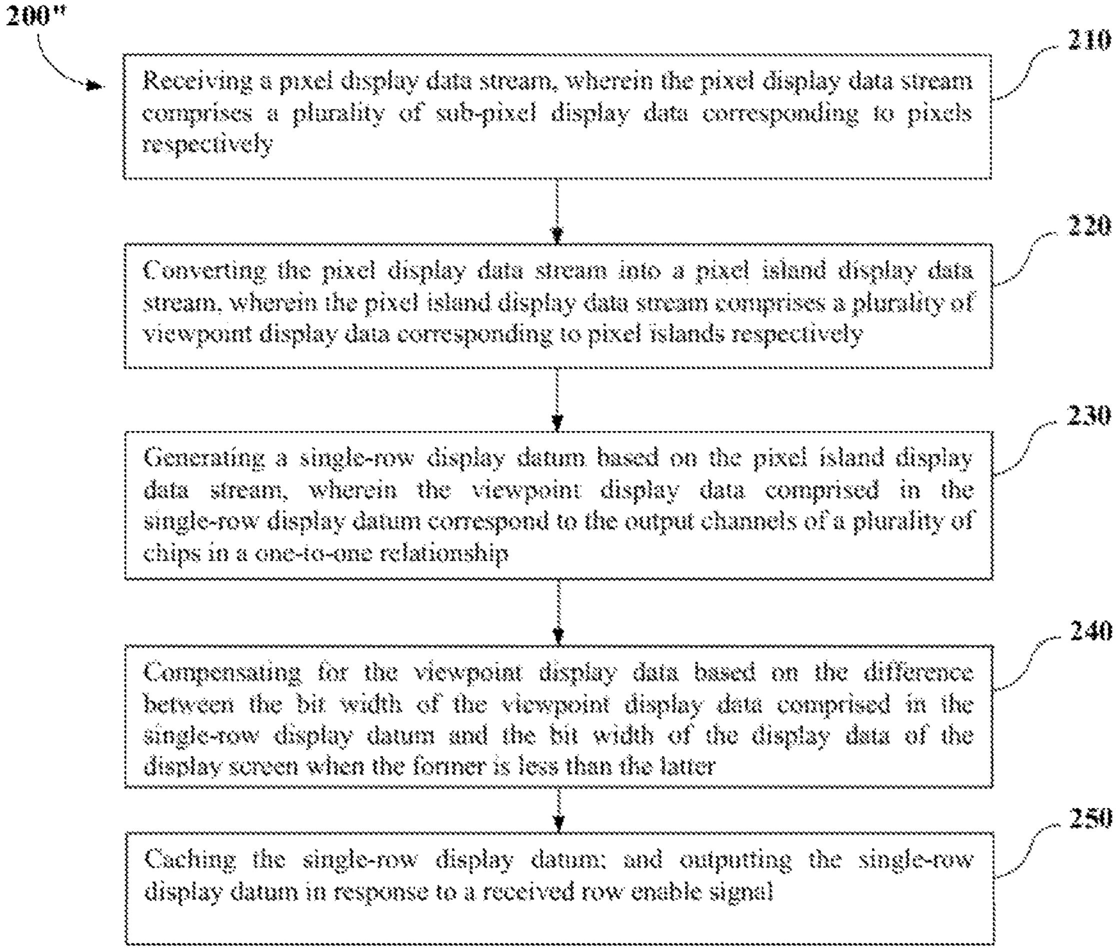
FIG. 19 shows a further display data processing method according to some exemplary embodiments of the present disclosure in the form of a flowchart.

FIG. 19 shows a further display data processing method according to some exemplary embodiments of the present disclosure in the form of a flowchart. As shown in FIG. 19, the display data processing method 200" comprises steps 210, 220, 230, 240 and 250. The steps 210, 220 and 230 are the same as the corresponding steps of the display data processing method 200 as already described in detail, and the step 240 is the same as the corresponding step of the display data processing method 200' as already described in detail, which will not be reiterated herein. In the step 250, the single-row display datum is cached; and the single-row display datum is outputted in response to a received row enable signal. The normal display of an image requires the matching output of row scanning signals (e.g., GOA signals) and display data signals. Thus, the processed single-row display data may be respectively cached into RAM memory/storage area, and then outputted according to the received row scanning signals and timing signals, thereby ensuring the timing match between the outputted single-row display data and the row scanning signals. In an exemplary embodiment, the processed single-row display data may be partitioned and cached in different RAM memories/storage areas. For example, with reference to FIG. 15, data in port data streams Port1 and Port2 may be stored in a first RAM memory/storage area, data in port data streams Port3 and Port4 may be stored in a second RAM memory/storage area, data in port data streams Port5 and Port6 may be stored in a third RAM memory/storage area, and data in port data streams Port7 and Port8 may be stored in a fourth RAM memory/storage area. However, any other suitable caching manner is also possible, which will not be limited herein.

Figure 20:
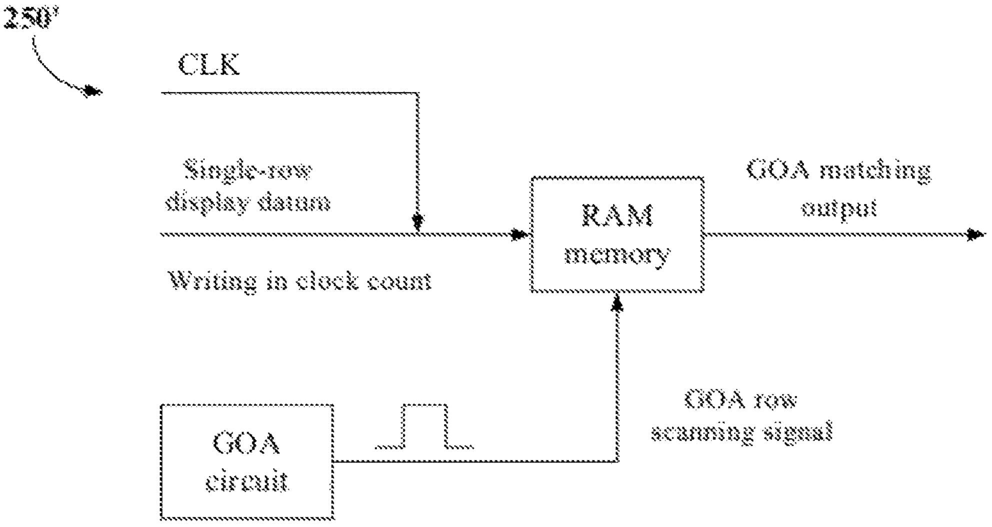
FIG. 20 schematically shows an access process for caching and reading out a single-row display datum.

FIG. 20 schematically shows an access process for caching and reading out a single-row display datum. As shown in FIG. 20, in the access process 250', the generated single-row display datum may be stored in the RAM memory/storage area in response to a clock count, the process of which is a process of caching the single-row display datum; and in a readout process, the single-row display datum is read out from the RAM memory/storage area in response to a GOA row scanning signal received from a GOA circuit, and outputted so as to achieve the matching output of a GOA timing signal.

Figure 21A:
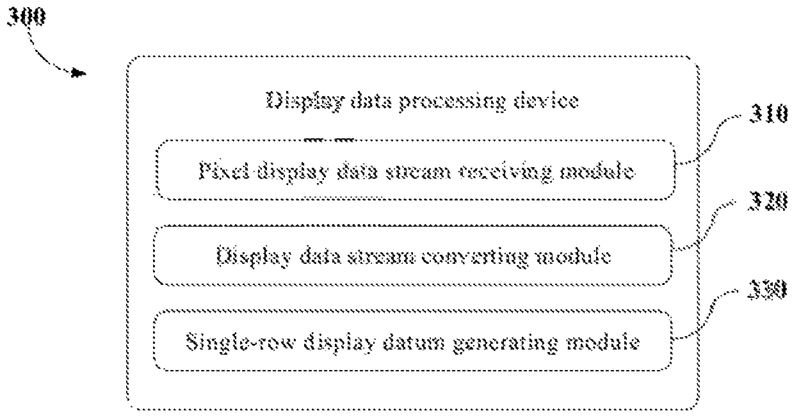
FIGS. 21*a* to 21*d* schematically show some display data processing devices according to some exemplary embodiments of the present disclosure in the form of a block diagram.

FIG. 21*a* schematically shows a display data processing device according to some exemplary embodiments of the present disclosure in the form of a block diagram. The display data processing device 300 may utilize various display data processing methods described in the present disclosure. As shown in FIG. 21*a*, the display data processing device 300 comprises a pixel display data stream receiving module 310, a display data stream converting module 320 and a single-row display datum generating module 330. The pixel display data stream receiving module 310 is configured to receive a pixel display data stream, wherein the pixel display data stream comprises a plurality of sub-pixel display data corresponding to pixels respectively. The display data stream converting module 320 is configured to convert the pixel display data stream into a pixel island display data stream, wherein the pixel island display data stream comprises a plurality of viewpoint display data corresponding to pixel islands respectively. The single-row display datum generating module 330 is configured to generate a single-row display datum based on the pixel island display data stream, wherein the viewpoint display data comprised in the single-row display datum correspond to the output channels of a plurality of chips in a one-to-one relationship. The above modules involve the operation of the steps 210 to 250 described above with respect to FIG. 2, so which will not be reiterated herein.

Figure 21B:
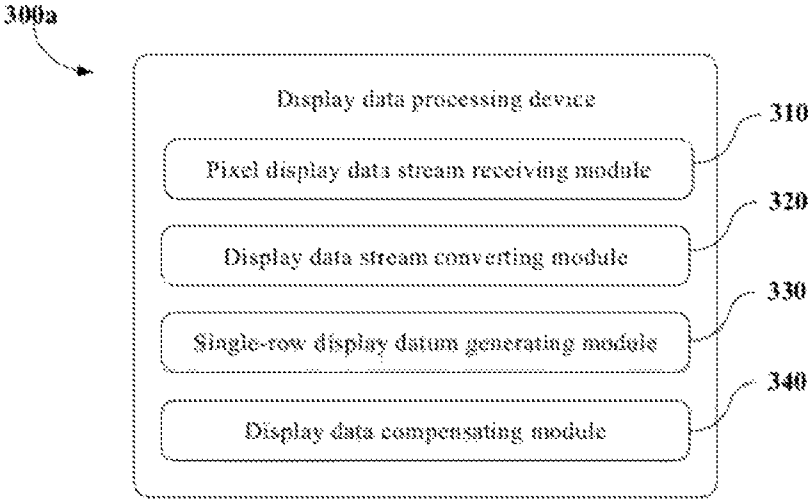
Figure 21C:
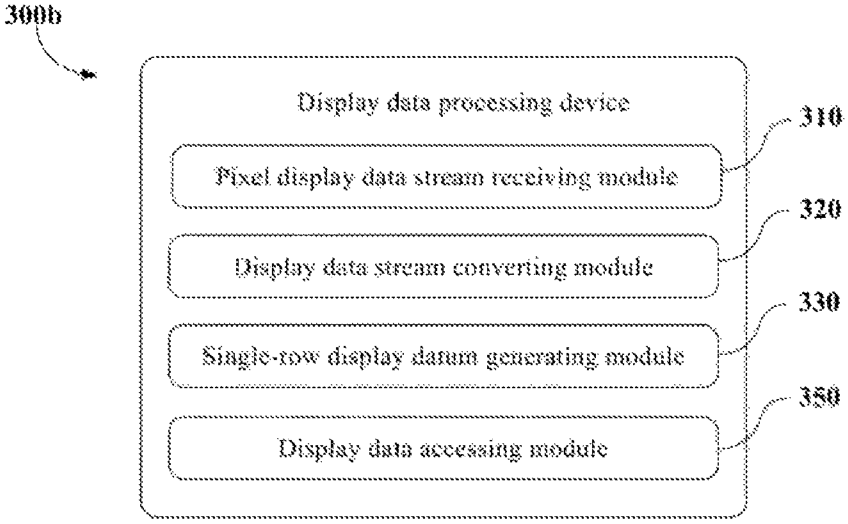
Figure 21D:
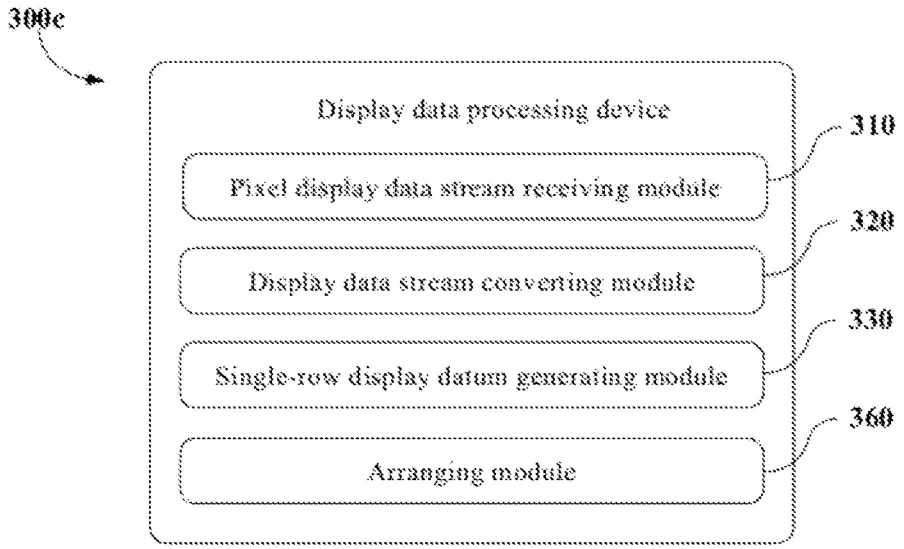

FIGS. 21*b* to 21*d* schematically show some other display data processing devices according to some exemplary embodiments of the present disclosure in the form of a block diagram. As shown in FIG. 21*b*, in addition to the modules 310, 320 and 330, the display data processing device 300*a* comprises a display data compensating module 340 configured to compensate for the viewpoint display data based on the difference between the bit width of the viewpoint display data comprised in the single-row display datum and the bit width of the display data of the display screen when the former is less than the latter. In a non-limiting embodiment, when the difference between the bit width of the viewpoint display data comprised in the single-row display datum and the bit width of the display data of the display screen is α bits, the viewpoint display data are multiplied by $2^{\alpha}$ for compensation, wherein α is an integer greater than 0. The display data compensating module 340 involves the operation of the step 240 described above with respect to FIG. 17, so which will not be reiterated herein. As shown in FIG. 21*c*, in addition to the modules 310, 320 and 330, the display data processing device 300*b* comprises a display data accessing module 350. The display data accessing module 350 is configured to cache the single-row display datum, and output the single-row display datum in response to a received row enable signal. The display data accessing module 350 involves the operation of the step 250 described above with respect to FIG. 19, so which will not be reiterated herein. As shown in FIG. 21*d*, in addition to the modules 310, 320 and 330, the display data processing device 300*c* comprises an arranging module 360. The arranging module 360 is configured to determine the arrangement of pixel display data corresponding to the pixels of an image to be displayed. It should be understood that in addition to the modules 310, 320 and 330, the display data processing device according to the present disclosure may comprise any one or any combination of the display data compensating module 340, the display data accessing module 350 and the arranging module 360, and the resulting display data processing device falls within the scope of the present disclosure.

The modules of the display data processing devices 300, 300*a*, 300*b* and 300*c* described above with respect to FIGS. 21*a* to 21*d* may be implemented in hardware or a combination of hardware and software and/or firmware. For example, these modules may be implemented as computer executable codes/instructions configured to be executed in one or more processors and stored in a computer readable storage medium. Alternatively, these modules may be implemented as hardware logic/circuits. For example, in some exemplary embodiments, these modules may be implemented by a field programmable gate array (i.e., FPGA). Furthermore, in some other exemplary embodiments, one or more of these modules may be implemented together in a System on Chip (SoC). The SoC may comprise an integrated circuit chip (including a processor (such as a central processing unit (CPU), a microcontroller, a microprocessor and a digital signal processor (DSP), and the like), a memory, one or more communication interfaces, and/or one or more components in other circuits), and may optionally execute the received program code and/or comprise embedded firmware to perform functions.

Figure 22:
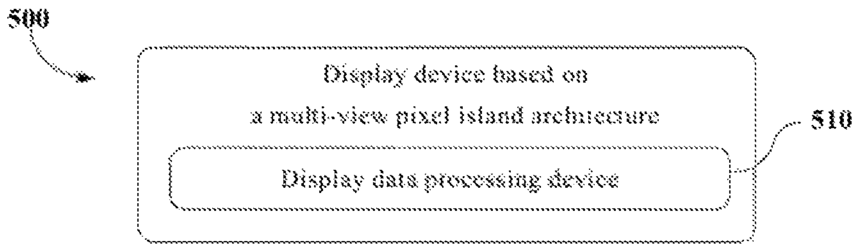
FIG. 22 schematically show a display device based on a multi-viewpoint pixel island architecture according to some exemplary embodiments of the present disclosure in the form of a block diagram.

FIG. 22 schematically show a display device based on a multi-viewpoint pixel island architecture according to some exemplary embodiments of the present disclosure in the form of a block diagram. As shown in FIG. 22, the display device 500 based on a multi-viewpoint pixel island architecture comprises a display data processing device 510. The display data processing device 510 may be implemented as any of the display data processing devices 300, 300*a*, 300*b* and 300*c* described above with respect to FIGS. 21*a* to 21*d* or any combination of the modules that each of them comprises.

Terms used herein are only used to describe the embodiments of the present disclosure, and are not intended to limit the present disclosure. As used herein, the singular forms of "a", "an", "the" and "said" are also intended to comprise the plural forms, unless otherwise specified clearly in the context. It shall also be further understood that the terms "comprise" and "include" used in present disclosure indicate the presence of the features, but do not exclude the presence or addition of one or more other features. The term "and/or" used herein comprises any and all combinations of one or more related items as listed. Although the terms "first", "second", "third", etc. can be used to describe various features herein, these features should not be limited by these terms. These terms are only used to distinguish one feature from another.

Unless otherwise defined, all terms (including technical terms and scientific terms) used herein have the same meaning as commonly understood by one having ordinary skills in the art, to which the present invention belongs. It should be further understood that terms such as those defined in a common dictionary should be construed as having the same meaning as in the pertinent field or in the context of the specification, and will not be construed in an ideal or overly formal sense, unless defined explicitly as such herein.

In the description of the specification of the present disclosure, expressions such as "an embodiment", "some embodiments", "exemplary embodiments", "specific examples" or "some examples" are intended to mean that specific features, structures, materials or characteristics described with reference to the embodiments or examples are contained in at least one embodiment or example of the present disclosure. In the specification of the present disclosure, schematic descriptions with respect to the above expressions herein do not have to be directed to the same embodiments or examples herein. Instead, specific features, structures, materials or characteristics described thereby may be combined in a suitable manner in any one or more embodiments or examples. Besides, where no contradiction is caused, one skilled in the art may combine and assemble different embodiments or examples described in the specification and features of different embodiments or examples.

Various techniques may be described herein in the general context of software, hardware, elements, or program modules. Generally, such modules comprise routines, programs, objects, elements, components, data structures, and so forth that perform particular tasks or implement particular abstract data types. The terms "module", "functionality" and "component" used herein generally represent software, firmware, hardware, or a combination thereof. The features of the techniques described herein are platform-independent, meaning that the techniques may be implemented on a variety of computing platforms having a variety of processors.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that can fetch instructions from an instruction execution system, device, or apparatus and execute the instructions). In addition, it should also be understood that the steps of the method shown in the flowchart or otherwise described herein are only exemplary, and do not mean that the steps of the method shown or described must be executed according to the steps shown or described. On the contrary, the steps of the method shown in the flowchart or otherwise described herein may be executed in a different order from that in the present disclosure or executed simultaneously. In addition, the steps of the method shown in the flowchart or otherwise described herein may also comprise other additional steps as required.

It should be understood that various portions of the present disclosure may be implemented by hardware, software, firmware, or a combination thereof. In the above embodiments, multiple steps or methods may be implemented in software or firmware stored in memory and executed by a suitable instruction execution system. For example, if implemented in hardware, they may be implemented by using any one or a combination of the following techniques known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

One of ordinary skill in the art may understand that all or part of the steps of the methods in the above specific embodiments may be implemented by hardware related to program instructions. The program may be stored in a computer-readable storage medium, and comprise one of the steps for executing a method embodiment or a combination thereof when executed.

Although the present disclosure has been described in detail in connection with some exemplary embodiments, it is not intended to be limited to the specific forms described herein. On the contrary, the scope of the present disclosure is limited only by the appended claims.

What is claimed is:

1. A display data processing method, comprising:

receiving a pixel display data stream, wherein the pixel display data stream comprises a plurality of sub-pixel display data corresponding to pixels respectively;

converting the pixel display data stream into a pixel island display data stream, wherein the pixel island display data stream comprises a plurality of viewpoint display data corresponding to pixel islands respectively; and generating a single-row display datum based on the pixel island display data stream, wherein the viewpoint display data comprised in the single-row display datum correspond to output channels of a plurality of chips in a one-to-one relationship.

2. The display data processing method according to claim 1, wherein the converting the pixel display data stream into a pixel island display data stream comprises:

acquiring $i \times k$ sub-pixel display data corresponding to i pixels from the pixel display data stream, wherein i and k are both integers greater than 0;

marking $m \times n$ sub-pixel display data of the $i \times k$ sub-pixel display data as viewpoint display data corresponding to m×n viewpoints of m pixel islands, wherein m and n are both integers greater than 0, and m×n=i×k; and rearranging the viewpoint display data according to an architecture of the pixel islands to convert the pixel display data stream into the pixel island display data stream.

3. The display data processing method according to claim 1, wherein the converting the pixel display data stream into a pixel island display data stream comprises:

acquiring i×k sub-pixel display data corresponding to i pixels from the pixel display data stream, wherein i and k are both integers greater than 0;

marking m×n sub-pixel display data of the i×k sub-pixel display data as viewpoint display data corresponding to m×n viewpoints of m pixel islands, wherein m and n are both integers greater than 0, and m×n<i×k;

marking sub-pixel display data, which are not marked as the viewpoint display data, of the i×k sub-pixel display data as dummy viewpoint display data; and rearranging the viewpoint display data and the dummy viewpoint display data according to an architecture of the pixel islands to convert the pixel display data stream into the pixel island display data stream.

4. The display data processing method according to claim 3, wherein the generating a single-row display datum based on the pixel island display data stream comprises:

removing the dummy viewpoint display data from the pixel island display data stream; and generating the single-row display datum based on the pixel island display data stream with the dummy viewpoint display data removed.

5. The display data processing method according to claim 1, wherein the generating a single-row display datum based on the pixel island display data stream comprises:

conducting data functionalization for the pixel island display data stream to generate a data-functionalized pixel island display data stream;

according to a number of the viewpoint display data corresponding to each chip in the single-row display datum, distinguishing the viewpoint display data corresponding to the chips from the data-functionalized pixel island display data stream; and according to a numbering sequence of the plurality of chips, sequentially rearranging the viewpoint display data corresponding to the chips according to a sequence of chip input ports to generate the single-row display datum.

6. The display data processing method according to claim 5, wherein the conducting data functionalization for the pixel island display data stream to generate a data-functionalized pixel island display data stream comprises:

rearranging the pixel island display data stream into an odd-numbered chip display data stream and an even-numbered chip display data stream, wherein the odd-numbered chip display data stream is used to provide the viewpoint display data for odd-numbered chips, and the even-numbered chip display data stream is used to provide the viewpoint display data for even-numbered chips; and wherein the odd-numbered chip display data stream and the even-numbered chip display data stream together comprise the data-functionalized pixel island display data stream.

7. The display data processing method according to claim 6, wherein the according to the number of the viewpoint display data corresponding to each chip in the single-row display datum, distinguishing the viewpoint display data corresponding to the chips from the data-functionalized pixel island display data stream comprises:

according to the number of the viewpoint display data corresponding to each chip in the single-row display datum, distinguishing the viewpoint display data corresponding to the odd-numbered chips of the plurality of chips from the odd-numbered chip display data stream; and according to the number of the viewpoint display data corresponding to each chip in the single-row display datum, distinguishing the viewpoint display data corresponding to the even-numbered chips of the plurality of chips from the even-numbered chip display data stream.

8. The display data processing method according to claim 5, wherein the conducting data functionalization for the pixel island display data stream to generate a data-functionalized pixel island display data stream comprises:

rearranging the pixel island display data stream into an odd-numbered chip display data stream and an even-numbered chip display data stream, wherein the odd-numbered chip display data stream is used to provide the viewpoint display data for odd-numbered chips, and the even-numbered chip display data stream is used to provide the viewpoint display data for even-numbered chips;

rearranging the odd-numbered chip display data stream into odd-numbered chip multiplex display data streams which are of a same number as multiplex groups of the pixel islands, wherein one odd-numbered chip multiplex display data stream is used to provide the viewpoint display data for odd-numbered chips corresponding to one corresponding multiplex group; and rearranging the even-numbered chip display data stream into even-numbered chip multiplex display data streams which are of the same number as the multiplex groups of the pixel islands, wherein one even-numbered chip multiplex display data stream is used to provide the viewpoint display data for even-numbered chips corresponding to one corresponding multiplex group, wherein all the odd-numbered chip multiplex display data streams and all the even-numbered chip multiplex display data streams together comprise the data-functionalized pixel island display data stream.

9. The display data processing method according to claim 8, wherein the according to the number of the viewpoint display data corresponding to each chip in the single-row display datum, distinguishing the viewpoint display data corresponding to the chips from the data-functionalized pixel island display data stream comprises:

according to the number of the viewpoint display data corresponding to each chip in the single-row display datum, distinguishing the viewpoint display data provided for the odd-numbered chips of the plurality of chips from all the odd-numbered chip multiplex display data streams; and according to the number of the viewpoint display data corresponding to each chip in the single-row display datum, distinguishing the viewpoint display data provided for the even-numbered chips of the plurality of chips from all the even-numbered chip multiplex display data streams.

10. The display data processing method according to claim 5, wherein the conducting data functionalization for the pixel island display data stream to generate a data-functionalized pixel island display data stream comprises:

rearranging the pixel island display data stream into multiplex display data streams which are of a same number as multiplex groups of the pixel islands, wherein one multiplex display data stream is used to provide the viewpoint display data for the pixel islands comprised in one corresponding multiplex packet, and wherein all the multiplex display data streams constitute-comprise the data-functionalized pixel island display data stream.

11. The display data processing method according to claim 1, wherein the generating a single-row display datum based on the pixel island display data stream comprises:

according to a number of the viewpoint display data corresponding to each chip in the single-row display datum, distinguishing the viewpoint display data corresponding to the chips from the pixel island display data stream; and according to a numbering sequence of the plurality of chips, sequentially rearranging the viewpoint display data corresponding to the chips according to a sequence of chip input ports to generate the single-row display datum.

12. The display data processing method according to claim 1, further comprising:

compensating for the viewpoint display data based on a difference between a bit width of the viewpoint display data comprised in the single-row display datum and a bit width of display data of a display screen when the former is less than the latter.

13. The display data processing method according to claim 12, wherein the compensating for the viewpoint display data based on a difference between a bit width of the viewpoint display data comprised in the single-row display datum and a bit width of display data of a display screen when the former is less than the latter comprises:

multiplying the viewpoint display data by $2^{\alpha}$ for compensation when the difference between the bit width of the viewpoint display data comprised in the single-row display datum and the bit width of the display data of the display screen is $\alpha$ bits, wherein $\alpha$ is an integer greater than 0.

14. The display data processing method according to claim 1, further comprising:

caching the single-row display datum; and outputting the single-row display datum in response to a received row enable signal.

15. A display data processing device, comprising:

a pixel display data stream receiving module configured to receive a pixel display data stream, wherein the pixel display data stream comprises a plurality of sub-pixel display data corresponding to pixels respectively;

a display data stream converting module configured to convert the pixel display data stream into a pixel island display data stream, wherein the pixel island display data stream comprises a plurality of viewpoint display data corresponding to pixel islands respectively; and a single-row display datum generating module configured to generate a single-row display datum based on the pixel island display data stream, wherein the viewpoint display data comprised in the single-row display datum correspond to output channels of chips in a one-to-one relationship.

16. The display data processing device according to claim 15, further comprising:

a display data compensating module configured to compensate for the viewpoint display data based on a difference between a bit width of the viewpoint display data comprised in the single-row display datum and a bit width of display data of a display screen when the former is less than the latter.

17. The display data processing device according to claim 15, further comprising:

a display data accessing module configured to cache the single-row display datum, and output the single-row display datum in response to a received row enable signal.

18. The display data processing device according to claim 15, further comprising:

an arranging module configured to determine arrangement of pixel display data corresponding to pixels of an image to be displayed.

19. The display data processing device according to claim 15, wherein the display data processing device is implemented based on an FPGA.

20. A display device based on a multi-viewpoint pixel island architecture, wherein the display device based on the multi-viewpoint pixel island architecture comprises the display data processing device according to claim 15.

* * * * *